US012764738B2

(12) United States Patent
Maamari et al.

(10) Patent No.: US 12,764,738 B2
(45) Date of Patent: Oct. 13, 2026

(54) WIRELESS SIGNALING BASED ON DOWNLINK CANCELLATION INFORMATION AND UPLINK SKIPPING INFORMATION

(71) Applicant: QUALCOMM Incorporated, San Diego, CA (US)

(72) Inventors: Diana Maamari, San Diego, CA (US); Ahmed Attia Abotabl, San Diego, CA (US); Marwen Zorgui, San Diego, CA (US); Mickael Mondet, Louannec (FR); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 18/158,565

(22) Filed: Jan. 24, 2023

(65) Prior Publication Data

US 2024/0260026 A1 Aug. 1, 2024

(51) Int. Cl.
*H04W 72/00* (2023.01)
*H04W 72/1268* (2023.01)
(Continued)

(52) U.S. Cl.
CPC ....... *H04W 72/1268* (2013.01); *H04W 72/21* (2023.01); *H04W 72/56* (2023.01)

(58) Field of Classification Search
CPC . H04W 72/56; H04W 72/20; H04W 72/1268; H04W 72/21
See application file for complete search history.

(56) References Cited

U.S. PATENT DOCUMENTS

2022/0159701 A1* 5/2022 Islam .................... H04W 72/23
2024/0089958 A1* 3/2024 Ma ........................ H04W 76/28
(Continued)

OTHER PUBLICATIONS

Google Inc: "On XR-specific capacity enhancements techniques", 3GPP TSG RAN WG1 #111, R1-2212386, 3rd Generation Partnership Project (3GPP), Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, XP052222945, 8 Pages, Section 2, p. 1-p. 3.
(Continued)

*Primary Examiner* — Marcus Smith
*Assistant Examiner* — Shivakrishna Vallamdasu
(74) *Attorney, Agent, or Firm* — Holland & Hart LLP

(57) ABSTRACT

Methods, systems, and devices for wireless signaling based on downlink cancellation information and uplink skipping information are described. A user equipment (UE) may receive, from a network entity, scheduling information indicating a set of resources of a physical uplink shared channel (PUSCH) allocated for uplink transmissions. The UE may transmit uplink control information (UCI) including skipping information indicating a first subset of the set of resources of a PUSCH to remain unoccupied by transmissions by the UE. The UE may receive downlink control information (DCI) including uplink cancellation information indicating a second subset to remain unoccupied by transmissions by the UE. The UE may transmit uplink signaling via a portion of the set of resources based on the UCI, the DCI, or both. In some examples, the DCI may be transmitted before the UCI.

30 Claims, 25 Drawing Sheets

(51) Int. Cl.
*H04W 72/21* (2023.01)
*H04W 72/56* (2023.01)

(56) References Cited

U.S. PATENT DOCUMENTS

| | | | | |
|---|---|---|---|---|
| 2024/0147478 | A1* | 5/2024 | Babaei | H04L 1/1822 |
| 2024/0322979 | A1* | 9/2024 | Marinier | H04L 5/0055 |

OTHER PUBLICATIONS

International Search Report and Written Opinion—PCT/US2023/084000—ISA/EPO—Apr. 4, 2024.

ZTE: "On UL inter UE Tx prioritization/multiplexing", 3GPP TSG RAN WG1 Meeting #94bis, R1-1810346, 3rd Generation Partnership Project (3GPP), Mobile Competence Centre, 650, Route Des Lucioles, F-06921 Sophia-Antipolis Cedex, France, Sep. 29, 2018, 7 Pages, XP051517756, Section 2.2, p. 2-p. 5.

* cited by examiner

WIRELESS SIGNALING BASED ON DOWNLINK CANCELLATION INFORMATION AND UPLINK SKIPPING INFORMATION

FIELD OF TECHNOLOGY

The following relates to wireless communications, including wireless signaling based on downlink cancellation information and uplink skipping information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support wireless signaling based on downlink cancellation information and uplink skipping information. For example, the described techniques provide for the autonomous skipping of uplink resources by a user equipment (UE) (e.g., as indicated by skipping information carried by an uplink control information (UCI)) and the cancellation of allocated uplink resources by the network entity (e.g., as indicated in the cancellation information carried by a downlink control information (DCI)).

In some examples, the UE may transmit the UCI carrying the skipping information prior to receiving the DCI carrying the cancellation information. In such examples, in a first transmission mode, the cancellation information carried in the DCI may override the skipping information carried in the UCI. In a second transmission mode, the network entity may indicate (e.g., in the cancellation information) resources to be canceled in addition to those indicated by the skipping information, and the UE may refrain from transmitting the uplink signaling via the resources indicated in the skipping information and the resources indicated in the cancellation information. In some examples, the UE may select the first transmission mode or the second transmission mode based on whether the UCI and the DCI are communicated within a threshold amount of time. In some examples, the UE may first receive the cancellation information via DCI and may subsequently transmit the skipping information via the UCI. In such examples, the UCI may indicate additional resources to remain unoccupied (e.g., with reference to the resources available after applying the cancellation information).

A method for wireless communications at a user equipment (UE) is described. The method may include receiving scheduling information indicating a set of resources of a physical uplink shared channel allocated for uplink transmissions, transmitting UCI including skipping information indicating a first subset of the set of resources of a physical uplink shared channel to remain unoccupied by transmissions by the UE, receiving DCI including uplink cancellation information indicating a second subset of the set of resources of the physical uplink shared channel to remain unoccupied by transmissions by the UE, and transmitting uplink signaling via a portion of the set of resources of the physical uplink shared channel based on the UCI carrying the skipping information, the DCI indicating the uplink cancellation information, or both, where at least the second subset of the set of resources is unoccupied by the uplink signaling.

An apparatus for wireless communications at a UE is described. The apparatus may include a processor, memory coupled with the processor, and instructions stored in the memory. The instructions may be executable by the processor to cause the apparatus to receive scheduling information indicating a set of resources of a physical uplink shared channel allocated for uplink transmissions, transmit UCI including skipping information indicating a first subset of the set of resources of a physical uplink shared channel to remain unoccupied by transmissions by the UE, receive DCI including uplink cancellation information indicating a second subset of the set of resources of the physical uplink shared channel to remain unoccupied by transmissions by the UE, and transmit uplink signaling via a portion of the set of resources of the physical uplink shared channel based on the UCI carrying the skipping information, the DCI indicating the uplink cancellation information, or both, where at least the second subset of the set of resources is unoccupied by the uplink signaling.

Another apparatus for wireless communications at a UE is described. The apparatus may include means for receiving scheduling information indicating a set of resources of a physical uplink shared channel allocated for uplink transmissions, means for transmitting UCI including skipping information indicating a first subset of the set of resources of a physical uplink shared channel to remain unoccupied by transmissions by the UE, means for receiving DCI including uplink cancellation information indicating a second subset of the set of resources of the physical uplink shared channel to remain unoccupied by transmissions by the UE, and means for transmitting uplink signaling via a portion of the set of resources of the physical uplink shared channel based on the UCI carrying the skipping information, the DCI indicating the uplink cancellation information, or both, where at least the second subset of the set of resources is unoccupied by the uplink signaling.

A non-transitory computer-readable medium storing code for wireless communications at a UE is described. The code may include instructions executable by a processor to receive scheduling information indicating a set of resources of a physical uplink shared channel allocated for uplink transmissions, transmit UCI including skipping information indicating a first subset of the set of resources of a physical uplink shared channel to remain unoccupied by transmissions by the UE, receive DCI including uplink cancellation information indicating a second subset of the set of resources of the physical uplink shared channel to remain unoccupied by transmissions by the UE, and transmit uplink signaling via a portion of the set of resources of the physical uplink shared channel based on the UCI carrying the skipping information, the DCI indicating the uplink cancellation information, or both, where at least the second subset of the set of resources is unoccupied by the uplink signaling.

Some examples of the method, apparatuses, and non-transitory computer-readable medium described herein may further include operations, features, means, or instructions for receiving control signaling indicating a transmission mode associated with prioritizing the cancellation information over the skipping information, where transmitting the uplink signaling may be based on the transmission mode.

In some examples of the method, apparatuses, and non-transitory computer-readable medium described herein, transmitting the uplink signaling may include operations, features, means, or instructions for refraining from transmitting via the second subset of the set of resources based on overriding the skipping information according to the transmission mode and transmitting the uplink signaling via the first subset of the set of resources and a remainder of the set of resources according to the scheduling information and the uplink cancellation information.

Some examples of the method, apparatuses, and non-transitory computer-readable medium described herein may further include operations, features, means, or instructions for transmitting the uplink signaling according to the transmission mode associated with prioritizing the uplink cancellation information may be based on transmitting the UCI prior to receiving the DCI and an amount of time between transmitting the UCI and receiving the DCI does not satisfy a threshold amount of time.

Some examples of the method, apparatuses, and non-transitory computer-readable medium described herein may further include operations, features, means, or instructions for receiving control signaling indicating a transmission mode associated with a combination of the uplink cancellation information and the skipping information, where transmitting the uplink signaling may be based on the transmission mode.

Some examples of the method, apparatuses, and non-transitory computer-readable medium described herein may further include operations, features, means, or instructions for receiving, in the DCI, an indication of one or more additional resources with reference to the first subset of resources, where the one or more additional resources include the second subset of resources.

In some examples of the method, apparatuses, and non-transitory computer-readable medium described herein, transmitting the uplink signaling may include operations, features, means, or instructions for refraining from transmitting via the first subset of the set of resources and the second subset of the set of resources according to the transmission mode and transmitting the uplink signaling via a remainder of the set of resources.

Some examples of the method, apparatuses, and non-transitory computer-readable medium described herein may further include operations, features, means, or instructions for transmitting the uplink signaling according to the transmission mode associated with the combination of the uplink cancellation information and the skipping information may be based on transmitting the UCI prior to receiving the DCI and an amount of time between transmitting the UCI and receiving the DCI satisfies a threshold amount of time.

In some examples of the method, apparatuses, and non-transitory computer-readable medium described herein, receiving the scheduling information may include operations, features, means, or instructions for receiving radio resource control (RRC) signaling including configuration information corresponding to one or more configured grants (CGs) corresponding to the set of resources, a DCI message activating the CG, or a combination thereof.

In some examples of the method, apparatuses, and non-transitory computer-readable medium described herein, receiving the scheduling information may include operations, features, means, or instructions for receiving a DCI message including the scheduling information.

A method for wireless communications at a network entity is described. The method may include transmitting scheduling information indicating a set of resources of a physical uplink shared channel allocated for uplink transmissions by a UE, receiving UCI including skipping information indicating a first subset of the set of resources of a physical uplink shared channel to remain unoccupied by transmissions by the UE, transmitting DCI including uplink cancellation information indicating a second subset of the set of resources of a physical uplink shared channel to remain unoccupied by transmissions by the UE, and receiving uplink signaling via a portion of the set of resources of a physical uplink shared channel based on the UCI carrying the DCI indicating the skipping information, the uplink cancellation information, or both, where at least the second subset of the set of resources is unoccupied by the uplink signaling.

An apparatus for wireless communications at a network entity is described. The apparatus may include a processor, memory coupled with the processor, and instructions stored in the memory. The instructions may be executable by the processor to cause the apparatus to transmit scheduling information indicating a set of resources of a physical uplink shared channel allocated for uplink transmissions by a UE, receive UCI including skipping information indicating a first subset of the set of resources of a physical uplink shared channel to remain unoccupied by transmissions by the UE, transmit DCI including uplink cancellation information indicating a second subset of the set of resources of a physical uplink shared channel to remain unoccupied by transmissions by the UE, and receive uplink signaling via a portion of the set of resources of a physical uplink shared channel based on the UCI carrying the DCI indicating the skipping information, the uplink cancellation information, or both, where at least the second subset of the set of resources is unoccupied by the uplink signaling.

Another apparatus for wireless communications at a network entity is described. The apparatus may include means for transmitting scheduling information indicating a set of resources of a physical uplink shared channel allocated for uplink transmissions by a UE, means for receiving UCI including skipping information indicating a first subset of the set of resources of a physical uplink shared channel to remain unoccupied by transmissions by the UE, means for transmitting DCI including uplink cancellation information indicating a second subset of the set of resources of a physical uplink shared channel to remain unoccupied by transmissions by the UE, and means for receiving uplink signaling via a portion of the set of resources of a physical uplink shared channel based on the UCI carrying the DCI indicating the skipping information, the uplink cancellation information, or both, where at least the second subset of the set of resources is unoccupied by the uplink signaling.

A non-transitory computer-readable medium storing code for wireless communications at a network entity is described. The code may include instructions executable by a processor to transmit scheduling information indicating a set of resources of a physical uplink shared channel allocated for uplink transmissions by a UE, receive UCI including skipping information indicating a first subset of the set of resources of a physical uplink shared channel to remain unoccupied by transmissions by the UE, transmit DCI including uplink cancellation information indicating a second subset of the set of resources of a physical uplink shared channel to remain unoccupied by transmissions by the UE, and receive uplink signaling via a portion of the set of resources of a physical uplink shared channel based on the UCI carrying the DCI indicating the skipping information, the uplink cancellation information, or both, where at least the second subset of the set of resources is unoccupied by the uplink signaling.

Some examples of the method, apparatuses, and non-transitory computer-readable medium described herein may further include operations, features, means, or instructions for transmitting, to the UE, control signaling indicating a transmission mode associated with prioritizing the uplink cancellation information over the skipping information, where receiving the uplink signaling may be based on the transmission mode.

In some examples of the method, apparatuses, and non-transitory computer-readable medium described herein, receiving the uplink signaling may include operations, features, means, or instructions for receiving the uplink signaling via the first subset of the set of resources according to the scheduling information and the uplink cancellation information, where the second subset of the set of resources remains unoccupied by transmission from the UE according to the transmission mode associated with prioritizing the uplink cancellation information over the skipping information.

Some examples of the method, apparatuses, and non-transitory computer-readable medium described herein may further include operations, features, means, or instructions for receiving the uplink signaling according to the transmission mode associated with prioritizing the uplink cancellation information may be based on receiving the UCI prior to transmitting the DCI and an amount of time between receiving the UCI and transmitting the DCI does not satisfy a threshold amount of time.

Some examples of the method, apparatuses, and non-transitory computer-readable medium described herein may further include operations, features, means, or instructions for transmitting control signaling indicating a transmission mode associated with a combination of the uplink cancellation information and the skipping information, where transmitting the uplink signaling may be based on the transmission mode.

Some examples of the method, apparatuses, and non-transitory computer-readable medium described herein may further include operations, features, means, or instructions for transmitting, in the DCI, an indication of one or more additional resources with reference to the first subset of resources, where the one or more additional resources include the second subset of resources.

In some examples of the method, apparatuses, and non-transitory computer-readable medium described herein, receiving the uplink signaling may include operations, features, means, or instructions for refraining from monitoring the first subset of the set of resources and the second subset of the second resources according to the transmission mode and receiving the uplink signaling via a remainder of the set of resources.

Some examples of the method, apparatuses, and non-transitory computer-readable medium described herein may further include operations, features, means, or instructions for receiving the uplink signaling according to the transmission mode associated with the combination of the uplink cancellation information and the skipping information may be based on receiving the UCI prior to transmitting the DCI and an amount of time between receiving the UCI and transmitting the DCI satisfies a threshold amount of time.

In some examples of the method, apparatuses, and non-transitory computer-readable medium described herein, transmitting the scheduling information may include operations, features, means, or instructions for transmitting RRC signaling including configuration information corresponding to one or more CGs corresponding to the set of resources, a DCI message activating the CG, or a combination thereof.

In some examples of the method, apparatuses, and non-transitory computer-readable medium described herein, transmitting the scheduling information may include operations, features, means, or instructions for transmitting a DCI message including the scheduling information.

A method for wireless communications at a UE is described. The method may include receiving scheduling information indicating a set of resources of a physical uplink shared channel allocated for uplink transmissions, receiving DCI including uplink cancellation information indicating a first subset of the set of resources of a physical uplink shared channel to remain unoccupied by transmissions by the UE, transmitting, based on the uplink cancellation information, UCI including skipping information indicating a second subset of the set of resources of a physical uplink shared channel to remain unoccupied by transmissions by the UE, and transmitting uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

An apparatus for wireless communications at a UE is described. The apparatus may include a processor, memory coupled with the processor, and instructions stored in the memory. The instructions may be executable by the processor to cause the apparatus to receive scheduling information indicating a set of resources of a physical uplink shared channel allocated for uplink transmissions, receive DCI including uplink cancellation information indicating a first subset of the set of resources of a physical uplink shared channel to remain unoccupied by transmissions by the UE, transmit, based on the uplink cancellation information, UCI including skipping information indicating a second subset of the set of resources of a physical uplink shared channel to remain unoccupied by transmissions by the UE, and transmit uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

Another apparatus for wireless communications at a UE is described. The apparatus may include means for receiving scheduling information indicating a set of resources of a physical uplink shared channel allocated for uplink transmissions, means for receiving DCI including uplink cancellation information indicating a first subset of the set of resources of a physical uplink shared channel to remain unoccupied by transmissions by the UE, means for transmitting, based on the uplink cancellation information, UCI including skipping information indicating a second subset of the set of resources of a physical uplink shared channel to remain unoccupied by transmissions by the UE, and means for transmitting uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

A non-transitory computer-readable medium storing code for wireless communications at a UE is described. The code may include instructions executable by a processor to receive scheduling information indicating a set of resources of a physical uplink shared channel allocated for uplink transmissions, receive DCI including uplink cancellation information indicating a first subset of the set of resources of a physical uplink shared channel to remain unoccupied by transmissions by the UE, transmit, based on the uplink cancellation information, UCI including skipping information indicating a second subset of the set of resources of a physical uplink shared channel to remain unoccupied by transmissions by the UE, and transmit uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

Some examples of the method, apparatuses, and non-transitory computer-readable medium described herein may further include operations, features, means, or instructions for transmitting, in the UCI, an indication of one or more additional resources with reference to the first subset of resources, where the one or more additional resources include the second subset of resources.

Some examples of the method, apparatuses, and non-transitory computer-readable medium described herein may further include operations, features, means, or instructions for determining that the one or more additional resources may be to remain unoccupied based on an amount of data corresponding to the uplink signaling, where transmitting the UCI may be based on the determining.

In some examples of the method, apparatuses, and non-transitory computer-readable medium described herein, receiving the scheduling information may include operations, features, means, or instructions for receiving a CG via RRC signaling including an indication of the set of resources, a DCI message activating the CG, or a combination thereof.

In some examples of the method, apparatuses, and non-transitory computer-readable medium described herein, receiving the scheduling information may include operations, features, means, or instructions for receiving a DCI message including the scheduling information.

A method for wireless communications at a network entity is described. The method may include transmitting scheduling information indicating a set of resources of a physical uplink shared channel allocated for uplink transmissions by a UE, transmitting, to the UE, DCI including uplink cancellation information indicating a first subset of the set of resources of a physical uplink shared channel to remain unoccupied by transmissions by the UE, receiving, based on the uplink cancellation information, UCI including skipping information indicating a second subset of the set of resources of a physical uplink shared channel to remain unoccupied by transmissions by the UE, and receiving uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

An apparatus for wireless communications at a network entity is described. The apparatus may include a processor, memory coupled with the processor, and instructions stored in the memory. The instructions may be executable by the processor to cause the apparatus to transmit scheduling information indicating a set of resources of a physical uplink shared channel allocated for uplink transmissions by a UE, transmit, to the UE, DCI including uplink cancellation information indicating a first subset of the set of resources of a physical uplink shared channel to remain unoccupied by transmissions by the UE, receive, based on the uplink cancellation information, UCI including skipping information indicating a second subset of the set of resources of a physical uplink shared channel to remain unoccupied by transmissions by the UE, and receive uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

Another apparatus for wireless communications at a network entity is described. The apparatus may include means for transmitting scheduling information indicating a set of resources of a physical uplink shared channel allocated for uplink transmissions by a UE, means for transmitting, to the UE, DCI including uplink cancellation information indicating a first subset of the set of resources of a physical uplink shared channel to remain unoccupied by transmissions by the UE, means for receiving, based on the uplink cancellation information, UCI including skipping information indicating a second subset of the set of resources of a physical uplink shared channel to remain unoccupied by transmissions by the UE, and means for receiving uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

A non-transitory computer-readable medium storing code for wireless communications at a network entity is described. The code may include instructions executable by a processor to transmit scheduling information indicating a set of resources of a physical uplink shared channel allocated for uplink transmissions by a UE, transmit, to the UE, DCI including uplink cancellation information indicating a first subset of the set of resources of a physical uplink shared channel to remain unoccupied by transmissions by the UE, receive, based on the uplink cancellation information, UCI including skipping information indicating a second subset of the set of resources of a physical uplink shared channel to remain unoccupied by transmissions by the UE, and receive uplink signaling via a portion of the set of resources of a physical uplink shared channel based on the UCI carrying the skipping information and the DCI indicating the uplink cancellation information, where the first subset of the set of resources and the second subset of the set of resources are unoccupied by the uplink signaling.

Some examples of the method, apparatuses, and non-transitory computer-readable medium described herein may further include operations, features, means, or instructions for receiving, in the UCI, an indication of one or more additional resources with reference to the first subset of resources, where the one or more additional resources include the second subset of resources.

In some examples of the method, apparatuses, and non-transitory computer-readable medium described herein, communicating, via at least the first subset of the set of resources, high priority wireless signaling.

In some examples of the method, apparatuses, and non-transitory computer-readable medium described herein, transmitting the scheduling information may include operations, features, means, or instructions for transmitting a CG via RRC signaling including an indication of the set of resources, a DCI message activating the CG, or a combination thereof.

In some examples of the method, apparatuses, and non-transitory computer-readable medium described herein, transmitting the scheduling information may include operations, features, means, or instructions for transmitting a DCI message including the scheduling information

DETAILED DESCRIPTION

Figure 1:
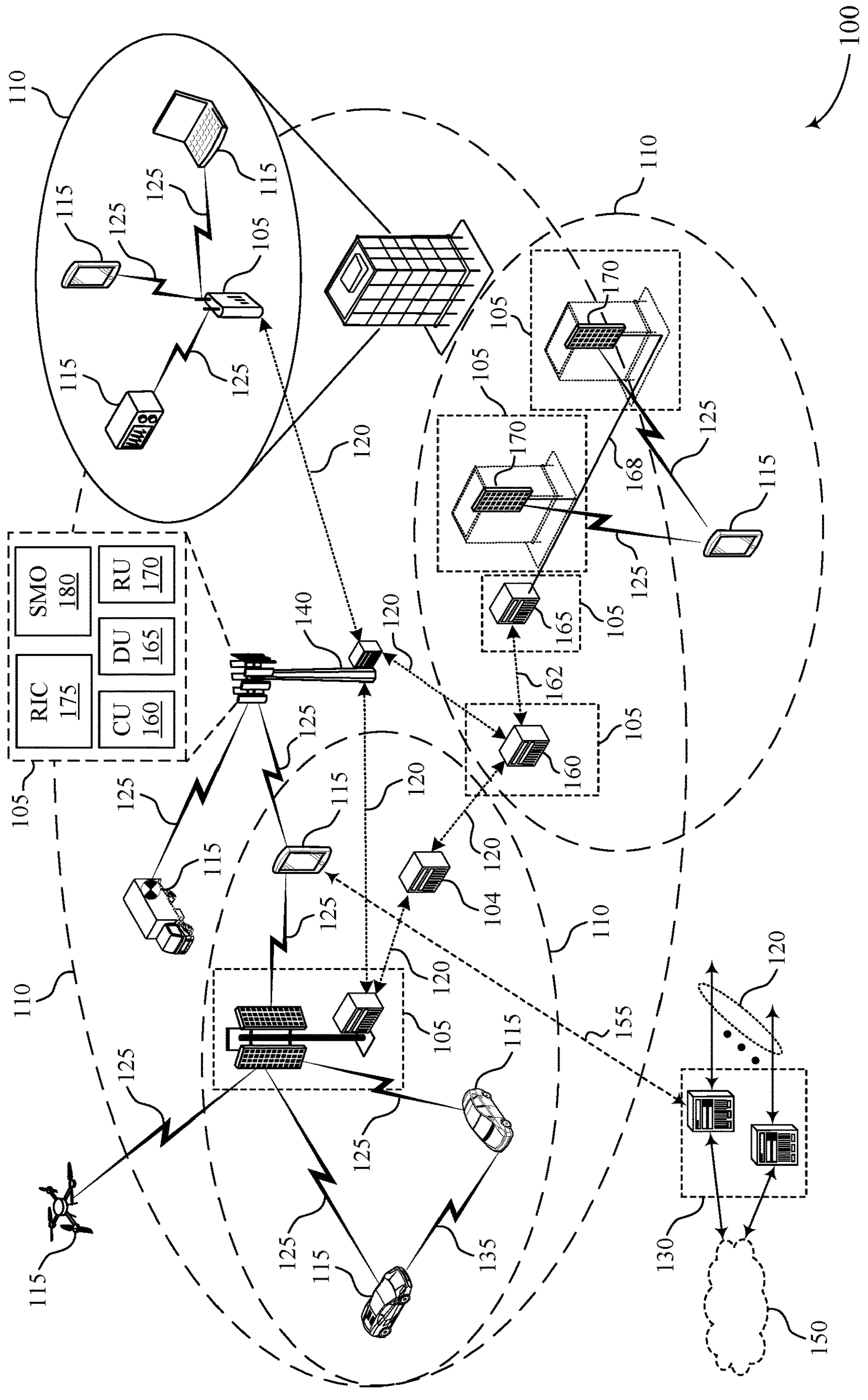
FIG. 1 illustrates an example of a wireless communications system that supports wireless signaling based on downlink cancellation information and uplink skipping information in accordance with one or more aspects of the present disclosure.

A network entity may assign resources to a UE using configured grants (CGs) or dynamic grants (DGs). In some examples, CGs may be configured using radio resource control (RRC) signaling (e.g., and activated via downlink control information (DCI)), and DGs may be configured dynamically using DCI signaling. In some cases, the granted resources may be reallocated to more efficiently utilize system resources and decrease system latency. For example, the UE may determine that uplink signaling may not occupy all allocated resources indicated by the network entity, and may indicate the unused resources as skipping information to the network entity in an uplink control information (UCI) message (e.g., uplink configuration information message). In some examples, the network entity may determine higher priority signaling for communication during the previously allocated resources (e.g., with another UE). In such examples, the network entity may transmit a DCI message (e.g., a DCI format 2_4), which cancels at least some resources the network entity previously allocated to the UE (e.g., which may be referred to as cancellation information). In some examples, the UE may transmit the UCI with skipping information and the network entity may transmit the DCI indicating cancellation information. The resources the UE indicates in the skipping information and the resources the network entity indicates in the cancellation information may at least partially overlap, or may be entirely distinct from each other. In some examples, the two mechanisms may interfere with each other (e.g., it may be unclear to the UE which resources are to be skipped or cancelled based on the cancellation information, the skipping information, or both).

Techniques described herein support the autonomous skipping of uplink resources by the UE (e.g., as indicated by the skipping information carried by the UCI), the cancellation of allocated uplink resources by the network entity (e.g., as indicated in the cancellation information carried by the DCI), or both. In some examples, the UE may transmit the UCI carrying the skipping information prior to receiving the DCI carrying the cancellation information. In such examples, in a first transmission mode, the cancellation information carried in the DCI may override the skipping information carried in the UCI (e.g., the UE may ignore the skipping information and transmit according to the cancellation information). In some examples, in a second transmission mode, the network entity may indicate resources to be canceled in addition to those indicated by the skipping information, and the UE may refrain from transmitting the uplink signaling via the resources indicated in the skipping information and the resources indicated in the cancellation information. In some examples, the UE may select the first transmission mode or the second transmission mode based on whether the UCI and the DCI are communicated within a threshold amount of time (e.g., if the UCI transmitted within the threshold amount of time of reception of the DCI, then the UE may adopt the first transmission mode).

In some examples, the UE may first receive the cancellation information via DCI and may subsequently transmit the skipping information via the UCI. In such examples, the UCI may indicate additional resources to remain unoccupied (e.g., with reference to the resources available after applying the cancellation information, instead of with reference to the original allocation of resources).

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to wireless signaling based on downlink cancellation information and uplink skipping information.

FIG. 1 illustrates an example of a wireless communications system 100 that supports wireless signaling based on downlink cancellation information and uplink skipping information in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support wireless signaling based on downlink cancellation information and uplink skipping information as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105). Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Techniques described herein support the autonomous skipping of uplink resources by the UE 115 (e.g., as indicated by the skipping information carried by the UCI) and the cancellation of allocated uplink resources by the network entity 105 (e.g., as indicated in the cancellation information carried by the DCI). In some examples, the UE 115 may transmit the UCI carrying the skipping information prior to receiving the DCI carrying the cancellation information. In such examples, in a first transmission mode, the cancellation information carried in the DCI may override the skipping information carried in the UCI (e.g., the UE 115 may ignore the skipping information and transmit according to the cancellation information). In some other examples, in a second transmission mode, the network entity 105 may indicate resources to be canceled in addition to those indicated by the skipping information, and the UE 115 may refrain from transmitting the uplink signaling via the resources indicated in the skipping information and the resources indicated in the cancellation information. In some examples, the UE 115 may select the first transmission mode or the second transmission mode based on whether the UCI and the DCI are communicated within a threshold amount of time (e.g., if the UCI transmitted within the threshold amount of time of reception of the DCI, then the UE 115 may adopt the first transmission mode).

In some examples, the UE 115 may first receive the cancellation information via DCI and may subsequently transmit the skipping information via the UCI. In such examples, the UCI may indicate additional resources to remain unoccupied (e.g., with reference to the resources available after applying the cancellation information, instead of with reference to the original allocation of resources).

Figure 2:
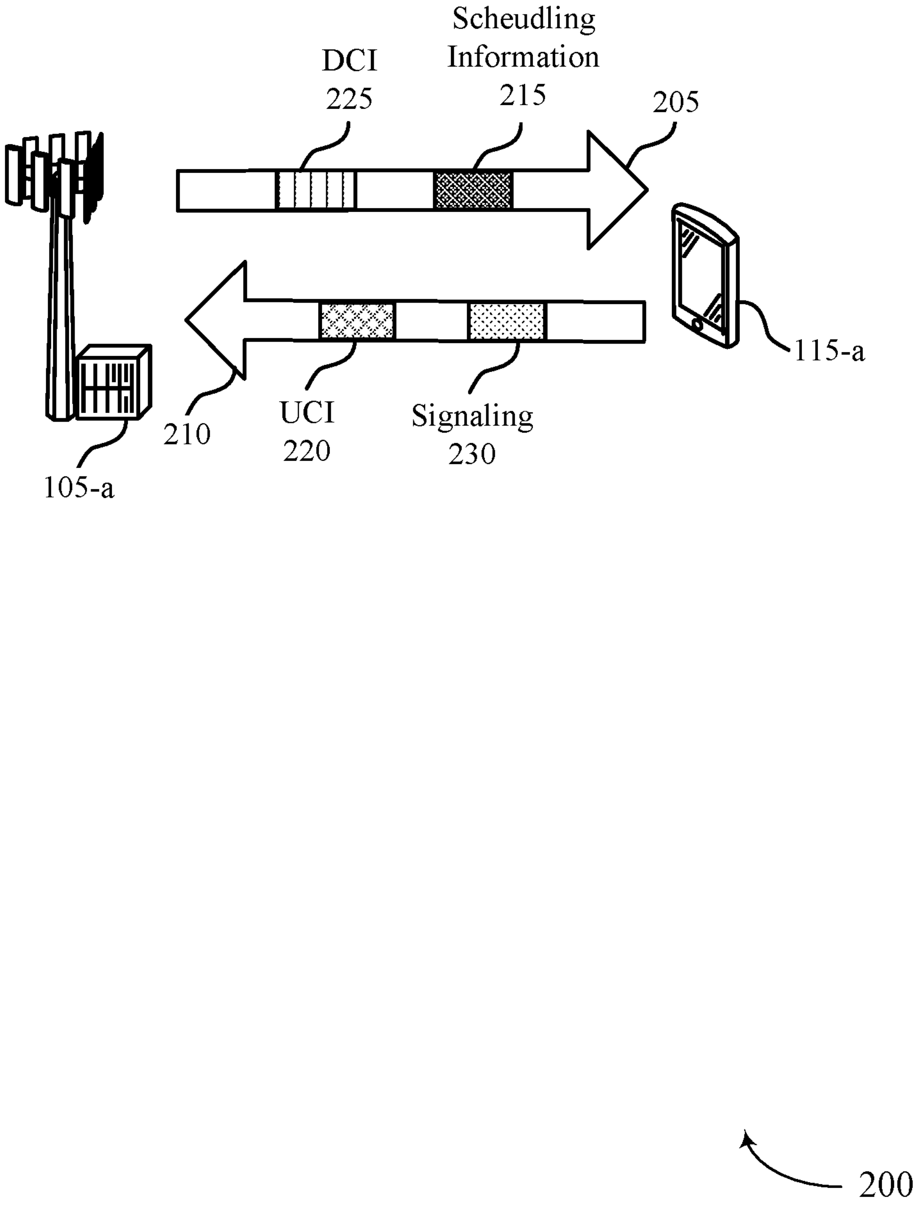
FIG. 2 illustrates an example of a wireless communications system that supports wireless signaling based on downlink cancellation information and uplink skipping information in accordance with one or more aspects of the present disclosure.

FIG. 2 illustrates an example of a wireless communications system 200 that supports wireless signaling based on downlink cancellation information and uplink skipping information in accordance with one or more aspects of the present disclosure. The wireless communications system 200 may implement, or may be implemented by, aspects of the wireless communications system 100. For example, the wireless communications system 200 may include a network entity 105-*a* and a UE 115-*a*, which may be examples of corresponding devices described herein with reference to FIG. 1. The UE 115-*a* may connect to and communicate with the network entity 105-*a* using communication links 205 and 210 (e.g., uplink communication links, downlink communication links).

The network entity 105-*a* may configure uplink resources via which the UE 115-*a* may transmit uplink signaling. The network entity 105-*a* may assign resources to a UE using configured grants (CGs), or dynamic grants (DGs). For instance, the network entity 105-*a* may transmit scheduling information 215, which may be RRC signaling including CG scheduling information (e.g., and a subsequent DCI message activating the CG resources). In some cases, the scheduling information 215 may be a DCI message dynamically scheduling resources. The UE 115-*a* may transmit uplink signaling 230 via the scheduled resources.

In some cases, the scheduled resources may be reallocated to more efficiently utilize system resources and decrease system latency. For example, the UE 115-*a* may determine that pending uplink signaling 230 may not occupy all allocated resources, and may indicate the unused resources to the network entity in a UCI message (e.g., skipping information indicating unused PUSCH resources, as described in greater detail with reference to FIG. 3). In some examples, the network entity may schedule signaling (e.g., higher priority signaling, such as ultra-reliable low latency communication) during at least a portion of the previously allocated resources. In such examples, the network entity may transmit a DCI 225 (e.g., a DCI format 2_4) including cancellation information (e.g., as described in greater detail with reference to FIG. 4), which cancels at least some resources the network entity previously allocated to the UE 115-*a*. In some examples, the UE 115-*a* may transmit the UCI 220 with skipping information and the network entity 105-*a* may transmit the DCI 225 indicating cancellation information. The resources the UE 115-*a* indicates in the skipping information and the resources the network entity 105-*a* indicates in the cancellation information may at least partially overlap, or may be entirely distinct from each other. Without a procedure to address the two (e.g., potentially conflicting) mechanisms for reallocating resources, the UE 115-*a* may transmit using a set of resources that does not entirely overlap with resources monitored by the network entity 105-*a*. That is, in cases where the skipping information and the cancellation information at least partially conflict with each other, communications may fail, interference may increase, signaling reliability may decrease, and retransmissions may increase, resulting in increased system latency and decreased user experience.

Techniques described herein support the autonomous skipping of uplink resources by the UE 115-*a* (e.g., as indicated by the skipping information carried by the UCI 220) and the cancellation of allocated uplink resources by the network entity 105-*a* (e.g., as indicated in the cancellation information carried by the DCI 225). In some examples, the UE 115-*a* may transmit the UCI 220 carrying the skipping information prior to receiving the DCI 225 carrying the cancellation information. In such examples, in a first transmission mode, the cancellation information carried in the DCI 225 may override the skipping information carried in the UCI 220. The UE 115-*a* may ignore the skipping information transmitted in the UCI, and may instead rely on the cancellation information in the DCI to determine which of the allocated resources to leave unoccupied. In some examples, in a second transmission mode, the network entity 105-*a* may indicate resources to be canceled in addition to those indicated by the skipping information, and the UE 115-*a* may use both the skipping information and cancellation information (e.g., may refrain from transmitting the uplink signaling 230 via the resources indicated in the skipping information and the resources indicated in the cancellation information). In some examples, the UE 115-*a* may select the first transmission mode or the second transmission mode based on whether the UCI 220 and the DCI 225 are communicated within a threshold amount of time (e.g., if the UCI 220 transmitted within the threshold amount of time of reception of the DCI 225, then the UE 115-*a* may adopt the first transmission mode).

In some examples, the UE 115-*a* may first receive the cancellation information via DCI 225 and may subsequently transmit the skipping information via the UCI 220. In such examples, the UCI 220 may indicate additional resources to remain unoccupied (e.g., with reference to the resources available after applying the cancellation information, instead of with reference to the originally allocation of resources).

Transmission of UCI 220 carrying skipping information is described in greater detail with reference to FIG. 3. Reception of the DCI 225 carrying cancellation information is described in greater detail with reference to FIG. 4. Techniques for uplink transmissions based on one or both of the DCI 225 carrying the cancellation information and the UCI 220 carrying the skipping information are described with reference to FIGS. 5-9.

Figure 3:
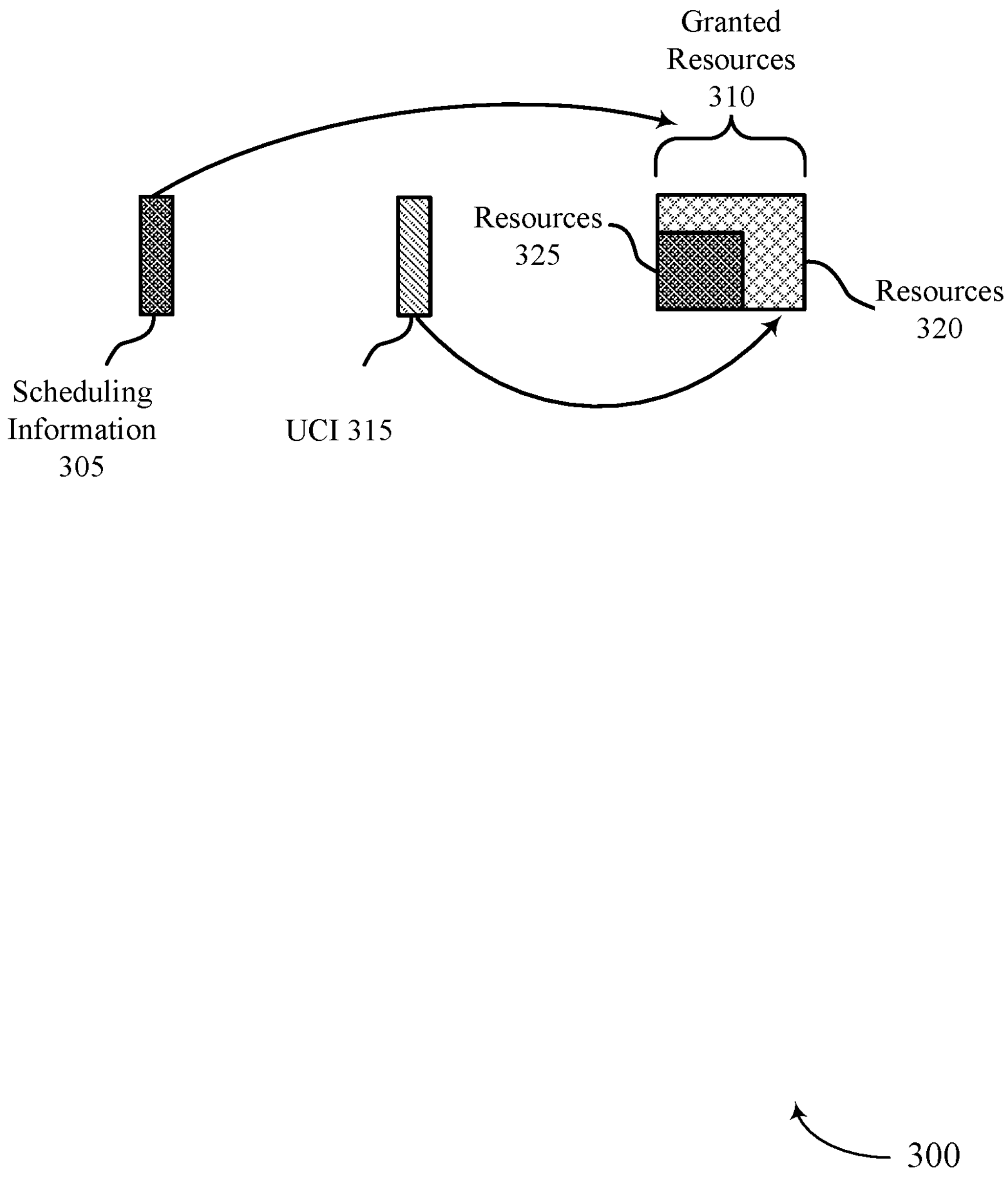
FIG. 3 illustrates an example of a timeline that supports wireless signaling based on downlink cancellation information and uplink skipping information in accordance with one or more aspects of the present disclosure.

FIG. 3 illustrates an example of a timeline 300 that supports wireless signaling based on downlink cancellation information and uplink skipping information in accordance with one or more aspects of the present disclosure. Timeline 300 may implement aspects of, or be implemented by aspects of, wireless communications system 100 and wireless communications system 200. For example, a network entity 105, and a UE 115, which may be examples of corresponding devices described with reference to wireless communications system 100 and wireless communications system 200, may communicate according to the timeline 300.

The network entity may transmit scheduling information 305 to the UE. The scheduling information 305 may include uplink CG allocation of resources (e.g., granted resources 310). The configured resource allocation may be semi-static, and may therefore be overallocated (e.g., the UE may not use all of the granted resources 410, leaving some resources 320 unoccupied). Such scenarios may occur for various types of grants (e.g., include type 2 CGs), where the allocation may be oversized based on pre-defined RRC configurations. In some examples, the scheduling information 305 may be part of a DG (e.g., carried via DCI). The resource allocation may be overallocated (e.g., because the network entity may not obtain periodic or regular buffer status reports (BSRs) from the UE indicating the buffer size of the UE. Even in cases where BSR reporting is provided by the UE, a large range of buffer sizes may be associated with a single BSR code point (e.g., up to seven or eight MBs). Thus, in the case of CG or DG, the scheduling information 305 may overallocated granted resources 310, and the UE may have sufficient data to transmit via resources 325 (e.g., a subset of the granted resources 410).

In some cases, the UE may transmit uplink signaling via a portion (e.g., the resources 325) of the granted resources 310 (e.g., sufficient resources to transmit a media access control (MAC) packed data unit (PDU). Uplink skipping (e.g., skipping a subset of the granted resources 310 and leaving such skipped resources unoccupied) may reduce power consumption at the UE, because the UE may not need to pad the transmission with zeros simply to occupy the otherwise unused resources 320. Uplink skipping over uplink shared channel resources may also increase the system efficiency, throughput, and capacity, because the network entity may be able to reuse the skipped resources 320 (e.g., for communications with another UE). The UE may partially utilize one or more PUSCH resource block (RB) allocations, or may change a modulation and coding scheme (MCS) for transmission while maintaining the same RB allocation (e.g., to realize power saving gains).

In some examples, as described herein, the UE may dynamically indicate unused resources to the network entity. For instance, such dynamic indications of unused PUSCH occasions (e.g., CG PUSCH occasions or resources) by the UE may result in improved throughput, increased system efficiency, and improved user experience. The UE may receive the scheduling information 305, and may determine that the UE will not utilize all of the granted resources 310. The UE may dynamically indicate such information via uplink control signaling (e.g., via the UCI 315, which may carry skipping information). The skipping information may indicate unused PUSCH resources (e.g., the resources 320)

of the granted resources 310. The UE may transmit the cancellation information dynamically. For example, the UE may transmit the cancellation information in a dynamic indication based on a CG-UCI, or a dynamic indication based on a dedicated UCI (e.g., designed for carrying the skipping information), or dynamic indication based on a MAC control element (CE), among other examples. The UCI 315 may carry the skipping information, which may indicate that the UE will skip the resources 320 (e.g., that the resources 320 will remain unoccupied.

The UE may then transmit uplink signaling via a subset of the granted resources 310 (e.g., may transmit via the resources 325), and the resources 320 may remain unoccupied (e.g., the UE may refrain from transmitting via the resources 320). In some examples, the network entity may reallocate the resources 320 (e.g., to another UE) based on receiving the UCI 315 and the skipping information.

In some examples, as described herein, the network entity may also determine resources of the granted resources 310 to remain unoccupied, and may indicate that such resources are canceled (e.g., cancellation information) to the UE (e.g., via a DCI message), as described in greater detail with reference to FIG. 5. The cancellation information and the skipping information may indicate resources that are not the same. Techniques described herein support consistent UE behavior allowing for efficiency cancellation or skipping (e.g., or both) of some granted resources 310. For example, the UE may ignore the skipping information and rely solely on the cancellation information, or may interpret the cancellation information as indicating resources to remain unoccupied in addition to the skipped resources indicated in the skipping information. In some examples, the UE may refrain from transmitting skipping information based on receiving cancellation information, or may indicate resources to be skipped in addition to the cancellation information, as described herein.

Figure 4:
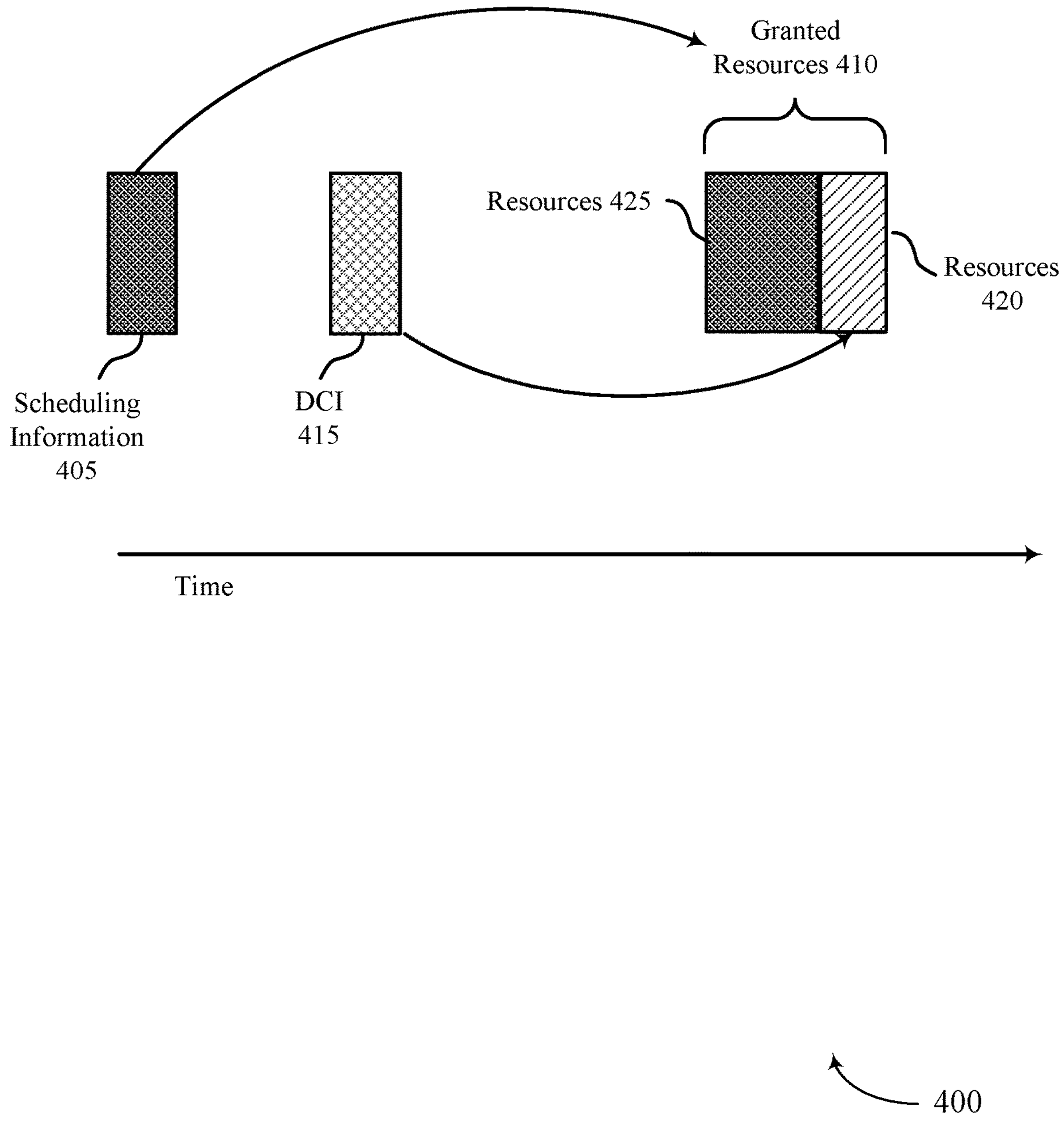
FIG. 4 illustrates an example of a timeline that supports wireless signaling based on downlink cancellation information and uplink skipping information in accordance with one or more aspects of the present disclosure.

FIG. 4 illustrates an example of a timeline 400 that supports wireless signaling based on downlink cancellation information and uplink skipping information in accordance with one or more aspects of the present disclosure. Timeline 400 may implement aspects of, or be implemented by aspects of, wireless communications system 100, wireless communications system 200, and timeline 300. For example, a network entity 105, and a UE 115, which may be examples of corresponding devices described with reference to wireless communications system 100 and wireless communications system 200, may communicate according to the timeline 400.

The network entity may transmit scheduling information 405 to the UE. The scheduling information 405 may include uplink CG allocation of resources (e.g., granted resources 410). The configured resource allocation may be semi-static, and may therefore be overallocated (e.g., the UE may not use all of the granted resources 410, leaving some resources 420 unoccupied). In some examples, the scheduling information 405 may be part of a DG (e.g., carried via the DCI 415). The resource allocation may be Thus, in the case of CG or DG, the scheduling information 405 may over allocate granted resources 410.

In some cases (e.g., when the network entity identifies high priority signaling for transmission via a portion of the granted resources 410), the network entity may cancel at least a portion of the granted resources 410 (e.g., may cancel the resources 420). For example, the network entity may transmit cancellation information (e.g., via the DCI 415). The cancelation information may include an uplink cancellation indication (ULCI). The ULCI may cancel a portion of the granted resources 410, such as the resources 420, leaving the canceled resources unoccupied. Such cancelling may reduce power consumption at the UE, and may increase the system efficiency, throughput, and capacity, because the network entity may be able to reuse the canceled resources 420 (e.g., for communications with another UE). The use of the ULCI may improve ultra-reliable low latency communications (URLLC) performance. For example, the network entity may cancel uplink resources previously assigned to the UE (e.g., enhanced mobile broadband (eMBB) services) URLLC uplink transmissions.

In some examples, as described herein, the network may transmit the DCI 415 to support uplink cancellation for PUSCH or SRS transmissions. For example, the network may include the ULCI in the DCI 415. For example, the network may schedule the DCI (e.g., the group-common DCI format 2_4) addressed by the cancellation indication radio network temporary identifier (CI-RNTI) to cancel uplink resources previously assigned (e.g., assigned to the eMBB service). The cancellation information (e.g., a cancellation indication such as the ULCI) may notify the UE to cancel uplink transmissions via time and frequency resources (e.g., sets of time, resources frequency resources, or both, such as the resources 420, within a reference frequency region (e.g., the granted resources 410). In some examples, the ULCI may apply to PUSCH, one or more PUSCH repetitions, and SRS, among other examples.

The UE may then transmit uplink signaling via a subset of the granted resources 410 (e.g., may transmit via the resources 425), and the resources 420 may remain unoccupied (e.g., the UE may refrain from transmitting via the resources 420) based on the uplink cancellation information (e.g., the UCLI). In some examples, the network entity may reallocate the resources 420 (e.g., to another UE) based on the DCI 415 carrying the cancellation information.

In some examples, when the UE receives the DCI 415 (e.g., the cancellation indication, which may be the DCI format 2_4), the UE may not support cancelation of the PUSCH or SRS before a threshold symbol (e.g., a symbol located at least a threshold time, which may be referred to as $T_{proc2}$ after a last symbol of a CORESET). The first symbol after $T_{proc2}$ after the end of a PDCCH reception (e.g., of the DCI 415) may be the first of a set of transmission configuration indicator (TCI) symbols.

In some examples, the DCI 415 (e.g., DCI format 2_4), may apply to a PUSCH transmission or a sounding reference signal (SRS) transmission for a serving cell. In some examples, such as if the PUSCH transmission or the SRS transmission is scheduled by a DCI 415 format 2_4, the indication by the DCI 415 is applicable to the PUSCH transmission or SRS transmission if the last symbol of the PDCCH reception providing the DCI 415 is earlier than the first symbol of the PDCCH reception providing the DCI 415. For the serving cell, the UE may determine that the first symbol of the set of symbols (e.g., $T_{c1}$) is the first symbol after a threshold (e.g., $T'_{proc,2}$). The threshold may define the time from the end of the PDCCH reception where the UE detects the DCI 415, and the threshold may be obtained from another parameter (e.g., $T_{proc,2}$) defining the PUSCH processing capability (e.g., assuming $$d_{2,1} = d_{offset} \cdot \frac{2^{-\mu_{uL}}}{2^{-\mu}},$$

where $d_{offset}$ is provided by delta offset, Luz is the smallest subcarrier spacing, and μ is the smallest subcarrier spacing between the subcarrier configuration of the PDCCH and the $\mu_{uL}$, which may be provided in a message such as a scs-SpecificCarrierList of FrequencyInfoUL). In some examples, the UE may not cancel the PUSCH transmission or the SRS transmission before a corresponding symbol (e.g., $T_{proc,2}$, where $d_{2,1}=0$) after a last symbol of a CORE-SET where the UE detects the DCI 415 (e.g., format 2_4).

In some examples, as described herein, the UE may also determine resources of the granted resources 410 to remain unoccupied, and may indicate that such resources are unoccupied (e.g., skipping information) to the network entity, as described with greater detail with reference to FIG. 3. The cancellation information and the skipping information may indicate resources that are not the same. Techniques described herein support efficient cancellation or skipping (e.g., or both) of some granted resources 410. In some examples, skipping may be autonomous by the UE (e.g., and indicated via a UCI message as skipping information) depending on an amount of data pending for transmission by the UE, and cancellation (e.g., indicated via the DCI 415 as cancellation information), may be indicated by the network, such as to cancel an uplink transmission for another higher priority user. Techniques described herein may provide for UE behavior when receiving cancellation information and transmitting skipping information, and may specify when the UE receives uplink cancellation information and determines that uplink skipping information may be useful. For example, the UE may ignore the skipping information and rely solely on the cancellation information, or may interpret the cancellation information as indicating resources to remain unoccupied in addition to the skipped resources indicated in the skipping information. In some examples, the UE may refrain from transmitting skipping information based on receiving cancellation information, or may indicate resources to be skipped in addition to the cancellation information, as described herein.

Figure 5:
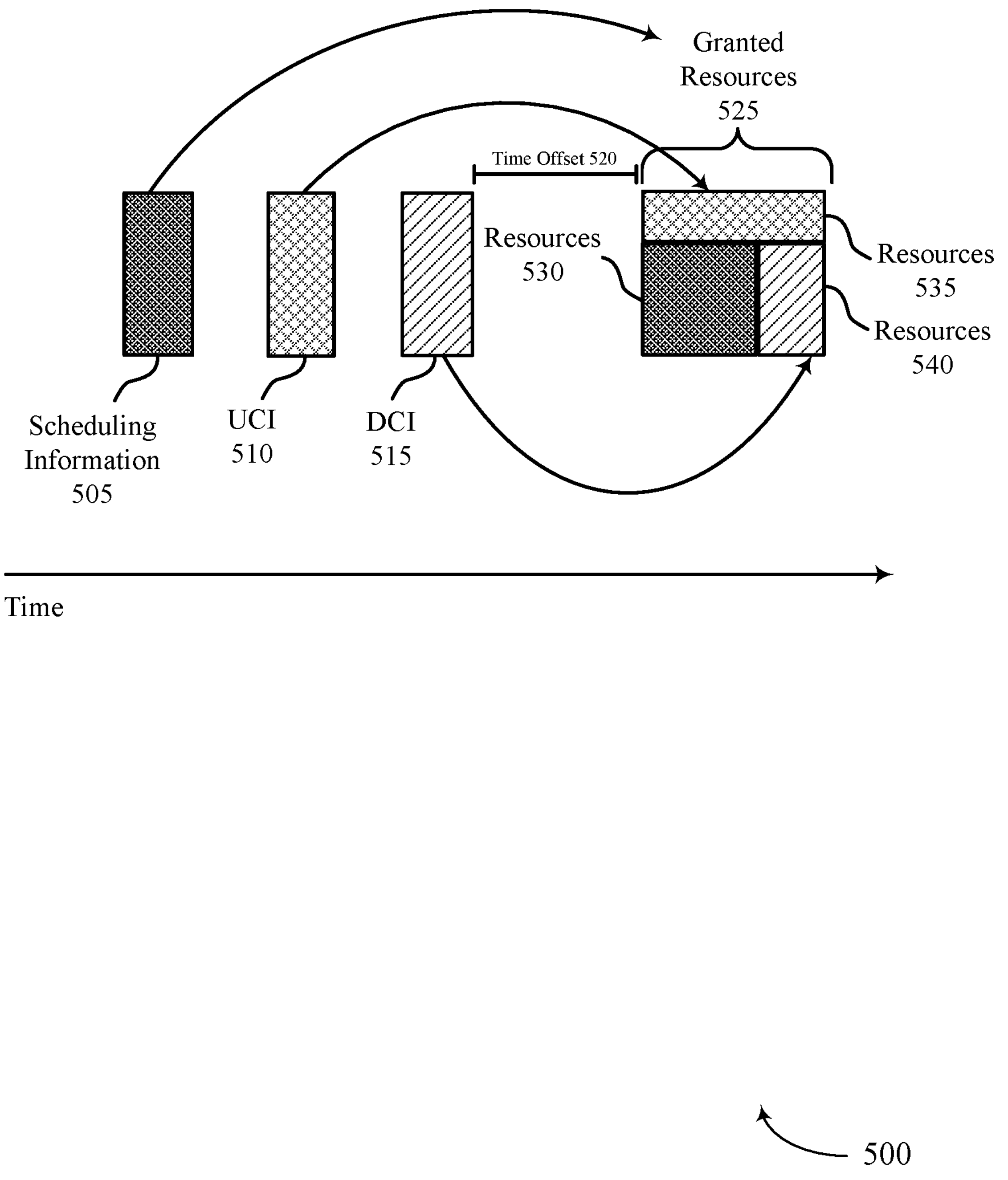
FIG. 5 illustrates an example of a timeline that supports wireless signaling based on downlink cancellation information and uplink skipping information in accordance with one or more aspects of the present disclosure.

FIG. 5 illustrates an example of a timeline 500 that supports wireless signaling based on downlink cancellation information and uplink skipping information in accordance with one or more aspects of the present disclosure. Timeline 500 may implement aspects of, or be implemented by aspects of, wireless communications system 100, wireless communications system 200, timeline 300, and timeline 400. For example, a network entity 105, and a UE 115, which may be examples of corresponding devices described with reference to wireless communications system 100 and wireless communications system 200, may communicate according to the timeline 500.

As described herein with respect to timeline 500, the network entity may transmit scheduling information 505 to the UE. The scheduling information may indicate the granted resources 525. The UE may transmit a UCI 510 including skipping information (e.g., a skipping indication), which may indicate resources 535 skipped by the UE. In some examples, the UCI 510 may be a UCI-CG with the skipping indication on PUCCH resources. The network entity may transmit DCI 515, which may indicate canceled resources 540 to be skipped by the UE. The UE may transmit the UCI 510 prior to receiving the DCI 515 (e.g., where the time offset 520 between the DCI 515 and the granted resources 525 satisfies $T_{proc2}$. The resources 535 and the resources 540 may not be the same resources (e.g., may partially overlap in time, or may not overlap in time at all).

In a first transmission mode (e.g., which may be referred to as mode 1), the cancellation information (e.g., indicating the canceled resources 540) may override the skipping information (e.g., the skipping indication carried by the UCI 510). In such examples, resources 535 and the resources 530 are used for uplink transmissions, and the resources 540 remain unoccupied). In a second transmission mode (e.g., which may be referred to as mode 2), the DCI 515 may indicate additional resources 540 to be canceled in addition to the resources 535 indicated by the UCI 510 (e.g., the resources 535 and the resources 540 are skipped). In such examples, the UE transmits using the resources 530. In some examples, the first and second transmission modes may be configured (e.g., the UE may be configured by the network), and in some examples may be selected based on a time offset 520 satisfying a threshold amount of time (e.g., $T_{proc2}$).

In the first transmission mode, the DCI 515 may override the UCI 510. That is, the DCI 515 may indicate cancellation information, and may override the skipping information carried by the UCI 510 transmitted by the UE to the network entity. In some examples, the UE may transmit the UCI 510 as a UCI-CG with a skipping indication of PUCCH resources before the DCI 515 (e.g., the DCI 2_4) where the time offset 520 satisfies a threshold (e.g., time offset 520 is greater than or equal to $T_{proc2}$). The UCI 510 may indicate unused resources, and the cancelling information included in the DCI 515 may override the UCI 510 (e.g., the resources that are not used for transmitting are those canceled by the DCI, the UCI is ignored, and the UE transmits uplink signaling via the resources 530 of the granted resources 525, and the resources 535. In some examples, the UCI 510 may be useful for partial skipping, and the UE may transmit the UCI 510 before receiving the DCI 515 (e.g., the UE does not have any indication that the DCI 515 will be transmitted and will indicate cancelation of more resources at the time of the transmission of the UCI 510). Thus, since the network entity has indicated further cancelation of resources using the DCI 515, the UE may take back the resources indicated as skipped in the UCI 510 (e.g., the resources 535). Both the UE and the network entity ignore, or override, the UCI 510, and the UE may transmit uplink signaling via the resources 535 (e.g., despite the skipping information carried in the UCI 510) according to the first transmission mode.

In the second transmission mode, the network entity may indicate in the DCI 515 canceled resources (e.g., the resources 540) to be skipped in addition to those indicated by the UCI 510 (e.g., the resources 535). For example, the cancellation information may indicate a delta (e.g., a change in addition to) with reference to the resources 535 indicated in the skipping information. The TB size transmitted in the second transmission mode may be smaller than a TB transmitted only based on the UCI 510. In such examples, the UE may transmit uplink signaling via the resources 530, and the resources 535 and the resources 540 may remain unoccupied by uplink transmissions by the UE (e.g., although some or all of the resources 535, the resources 540, or a combination thereof, may be used by the network entity to communicate with another wireless device).

In some examples, the modes may be selected based dynamic signaling (e.g., layer 1 signaling) or higher layer signaling (e.g., RRC signaling or MAC-CE signaling). In some examples, the mode selection may depend on the time between the UCI 510 and the DCI 515, which is described herein with reference to FIG. 6.

Figure 6:
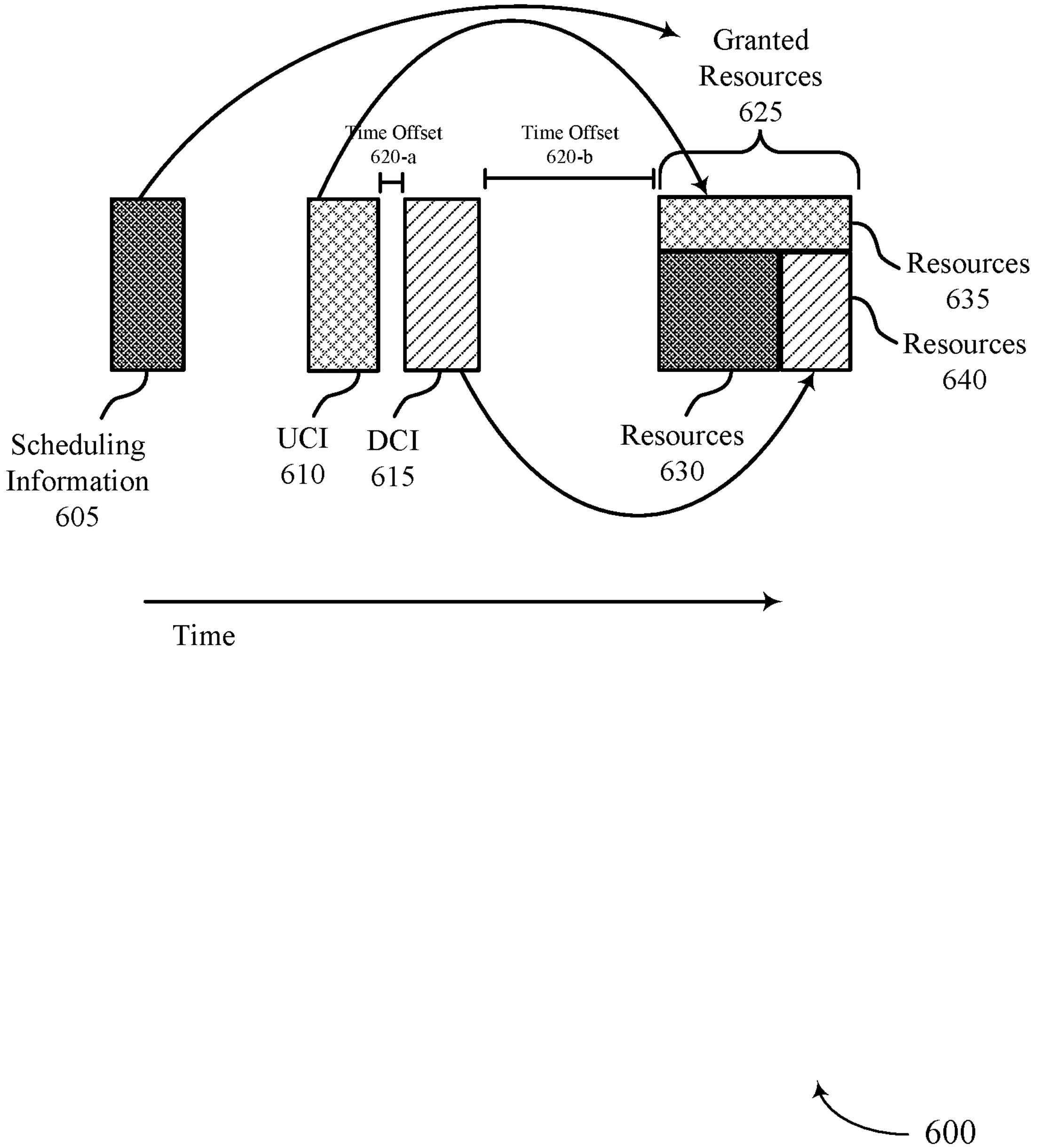
FIG. 6 illustrates an example of a timeline that supports wireless signaling based on downlink cancellation information and uplink skipping information in accordance with one or more aspects of the present disclosure.

FIG. 6 illustrates an example of a timeline 600 that supports wireless signaling based on downlink cancellation information and uplink skipping information in accordance with one or more aspects of the present disclosure. Timeline 600 may implement aspects of, or be implemented by aspects of, wireless communications system 100, wireless communications system 200, timeline 300, timeline 400, and timeline 500. For example, a network entity 105, and a UE 115, which may be examples of corresponding devices described with reference to wireless communications system 100 and wireless communications system 200, may communicate according to the timeline 600. The first transmission mode and the second transmission mode as described herein may be examples of the first transmission mode and the second transmission mode as described with reference to timeline 500.

The network entity may transmit scheduling information 605 to the UE. The scheduling information may include the granted resources 625. The UE may transmit a UCI 610 (e.g., which may include a skipping indication), which may indicate resources 635 skipped by the UE. The network entity may transmit DCI 615, which may include cancellation information (e.g., a cancellation indication) indicating canceled resources 640. The resources 635 and the resources 640 may not be the same resources. The UE may communicate uplink signaling during a portion or all of the granted resources 625 based on the UCI 610, the DCI 615, or both (e.g., in the first transmission mode or the second transmission mode as described in greater detail with reference to FIG. 5). For example, the UE may communicate uplink signaling during the resources 630. The time offset 620-*b* may be the time from the DCI 615 and the granted resources 625.

In some examples, selection of the transmission mode (e.g., the first transmission mode or the second transmission mode) may be based on control signaling (e.g., L1 signaling). For example, the mode may depend on a time between the UCI 510 and the DCI 515. The UCI 610 may be transmitted prior to the DCI 615, but the time offset 620-*a* may not be sufficient (e.g., may not satisfy a threshold amount of time) for the network entity to use the contents of the UCI 610 (e.g., the skipping information) to set the contents of the DCI 615. In such examples, the first transmission mode may be preferable to the second transmission mode (e.g., the second transmission mode may not be possible). In some examples, the network entity may include an indication to operate according to the first transmission mode in L1 signaling (e.g., the DCI 615). Similarly, as described herein with reference to FIG. 5, if the time offset 620-*a* satisfies the threshold timing offset (e.g., the network entity has sufficient time to receive the UCI 610 including the skipping information prior to generation and transmission of the DCI 615), the network entity may include, in the DCI 615, an indication that the UE is to operate according to mode 2 (e.g., the cancellation information is conveyed as a delta or in addition to the skipping information).

In some examples, the mode selection may be based on the time offset 620-*a*, or the time between transmission of the UCI 610 and reception of the DCI 615. For example, the UCI 610 may be transmitted before the DCI 615, but the time offset 620-*a* may not satisfy a threshold (e.g., the time offset 620-*a* is too small). If the time offset 620-*a* does not satisfy a threshold, and the UCI 610 is transmitted too close to the DCI 615 in time, then the network entity may not receive the UCI 610 in time to use the skipping information to determine the DCI 615. Thus, the UE and network entity may operate according the first transmission mode (e.g., may ignore the UCI 510). The UE may autonomously select the transmission mode based on whether the time offset 620-*a* satisfies the threshold (e.g., may autonomously adopt the first transmission mode if the time offset 620-*a* satisfies the threshold, and may autonomously adopt the second transmission mode if the time offset 620-*a* does not satisfy the threshold).

In some examples, the time offset 620-*a* may satisfy a threshold. The network entity may use the UCI 610 to determine the DCI 615, and the UE and network entity may operate according to the second transmission mode.

Figure 7:
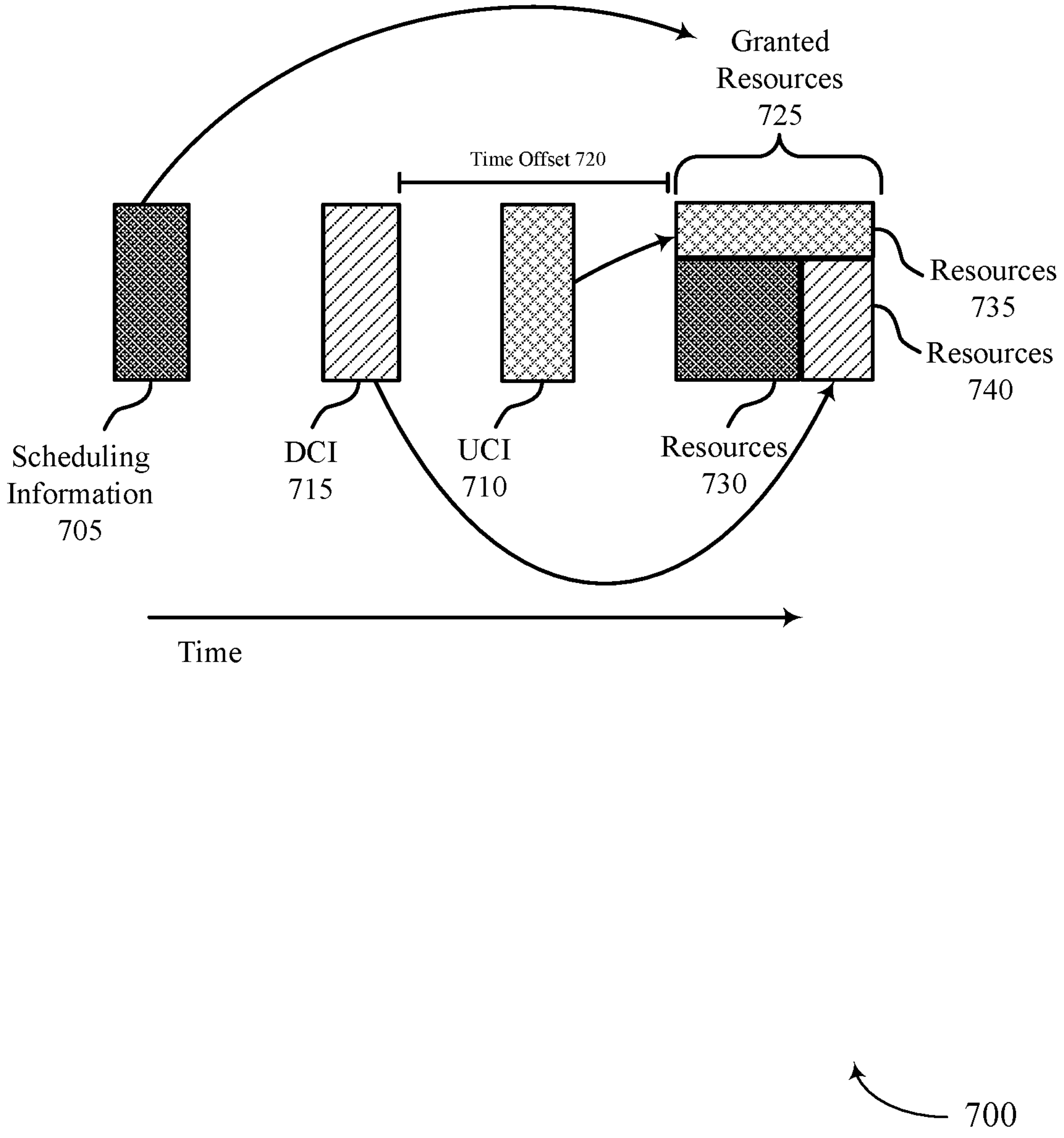
FIG. 7 illustrates an example of a timeline that supports wireless signaling based on downlink cancellation information and uplink skipping information in accordance with one or more aspects of the present disclosure.

FIG. 7 illustrates an example of a timeline 700 that supports wireless signaling based on downlink cancellation information and uplink skipping information in accordance with one or more aspects of the present disclosure. Timeline 700 may implement aspects of, or be implemented by aspects of, wireless communications system 100, wireless communications system 200, timeline 300, timeline 400, timeline 500, and timeline 600. For example, a network entity 105, and a UE 115, which may be examples of corresponding devices described with reference to wireless communications system 100 and wireless communications system 200, may communicate according to the timeline 700.

The network entity may transmit scheduling information 705 to the UE. The scheduling information may indicate the granted resources 725. The network entity may transmit DCI 715, which may include cancellation information (e.g., may indicate canceled resources 740) to be skipped by the UE. Following the DCI 715, the UE may transmit a UCI 710, which may include skipping information (e.g., a skipping indication), which may indicate resources 735 skipped by the UE. The resources 735 and the resources 740 may not be the same resources. In some examples, the time offset 720 may satisfy a threshold (e.g., $T_{proc2}$).

In some examples, the UE may transmit the UCI 710 (e.g., a UCI-CG with the skipping information) after receiving the DCI 715 (e.g., a DCI format 2_4), where the DCI 715 is transmitted satisfying $T_{proc2}$. The DCI 715 may indicate canceled resources, such as the resources 740. The UCI 710 may indicate additional resources skipped by the UE (e.g., the resources 735). The UE may not utilize the UCI 710 to send skipping information over the original full allocation (e.g., with reference to the full set of granted resources 725) but may indicate the skipping information with reference to a reduced set of resources (e.g., with reference to remaining resources of the granted resources 725 reduced by the resources 740). In such examples, the UE may transmit via the resources 730, and the resources 735 and the resources 740 may remain unoccupied by uplink transmissions by the UE (e.g., but may be reallocated for communications with another wireless device).

In some examples, the UE may indicate the partial uplink skipping (e.g., the skipping information) via a new dedicated UCI, which may be sent via PUCCH resources, or using a UCI-CG. IN some examples, the UE may transmit the UCI 710 by piggybacking on the PUSCH (e.g., may transmit a UCI 710 multiplexed with a PUSCH via at least a portion of the granted resources 725.

Figure 8:
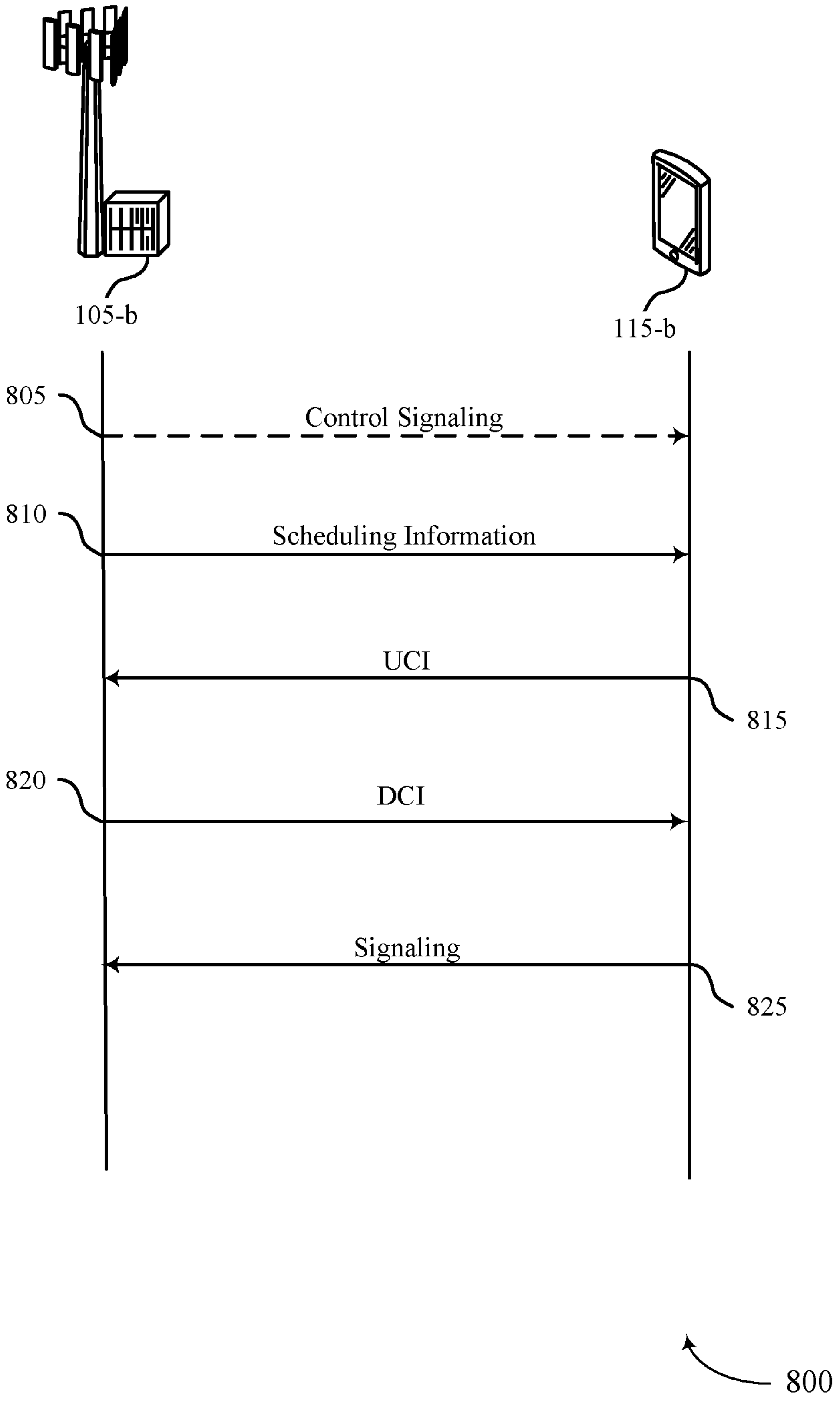
FIG. 8 illustrates an example of a process flow that supports wireless signaling based on downlink cancellation information and uplink skipping information in accordance with one or more aspects of the present disclosure.

FIG. 8 illustrates an example of a process flow 800 that supports wireless signaling based on downlink cancellation information and uplink skipping information in accordance with one or more aspects of the present disclosure. The process flow 800 may implement aspects of, or be implemented by aspects of, wireless communications system 100, wireless communications system 200, timeline 300, timeline 400, timeline 500, and timeline 600. For example, a network entity 105-*b*, and a UE 115-*b*, which may be examples of corresponding devices described with reference to wireless communications system 100 and wireless communications system 200, may communicate according to the process flow 800.

In the following description of the process flow 800, the operations between the UE 115-*b* and the network entity 105-*b* may be performed in different orders or at different times. Some operations may also be left out of the process flow 800, or other operations may be added. Although the UE 115-*b* and the network entity 105-*b* are shown performing the operations of the process flow 800, some aspects of some operations may also be performed by one or more other wireless devices.

At 805, the UE 115-*b* may receive control signaling indicating a transmission mode. For example, the control signaling may indicate a first transmission mode and a second transmission mode as described herein with reference to FIG. 5 and FIG. 6. The control signaling may indicate a transmission mode (e.g., a first transmission mode) associated with prioritizing the cancellation information (e.g., the DCI) over the skipping information (e.g., the UCI). In some examples, the control signaling may indicate a transmission mode (e.g., a second transmission mode) associated with a combination of the uplink cancellation information and the skipping information. The transmission of the uplink signaling at 825 may be based on the transmission mode. In some examples, the control signaling may be included in the scheduling information (e.g., at 810), or the DCI (e.g., transmitted at 820).

At 810, the network entity 105-*b* may transmit scheduling information indicating a set of resources of a PUSCH allocated for uplink transmissions. In some examples, the scheduling information may include RRC signaling including configuration information corresponding to one or more CGs corresponding to the set of resources, a DCI message activating the CG, or a combination thereof. In some examples, the scheduling information may be a DCI.

At 815, the UE 115-*b* may transmit UCI including skipping information indicating a first subset of the set of resources of a PUSCH to remain unoccupied by transmissions by the UE.

At 820, the network entity 105-*b* may transmit DCI including uplink cancellation information indicating a second subset of the set of resources of the PUSCH to remain unoccupied by transmissions by the UE. In some examples, the DCI may include an indication of one or more additional resources with reference to the first subset of resources, wherein the one or more additional resources include the second subset of resources.

At 825, the UE 115-*b* may transmit uplink signaling (e.g., signaling) via a portion of the set of resources of the PUSCH based on the UCI carrying the skipping information, the DCI indicating the uplink cancellation information, or both, where at least the second subset of the set of resources is unoccupied by the uplink signaling.

In some examples, transmitting the uplink signaling may include transmitting according to the first transmission mode, or the first transmission mode. The UE 115-*b* may refrain from transmitting via the second subset of the set of resources based on overriding the skipping information (e.g., the UCI) according to the transmission mode, and transmitting the uplink signaling via the first subset of the set of resources and a remainder of the set of resources according to the scheduling information and the uplink cancellation information. The UE 115-*b* may prioritize the uplink cancellation information based on transmitting the UCI prior to receiving the DCI and an amount of time between transmitting the UCI and receiving the DCI does not satisfy a threshold amount of time. For example, if the threshold amount of time is not met, the UE 115-*b* may ignore, or not prioritize the skipping information indicated in the UCI.

In a second transmission mode, transmitting the uplink signaling may include refraining from transmitting via the first subset of the set of resources and the second subset of the set of resources according to the transmission mode, and transmitting the uplink signaling via a remainder of the set of resources. The UE 115-*b* may transmit the uplink signaling according to the transmission mode (e.g., the second transmission mode) associated with the combination of the uplink cancellation information (e.g., the DCI) and the skipping information (e.g., the UCI) based on transmitting the UCI prior to receiving the DCI and an amount of time between transmitting the UCI and receiving the DCI satisfies a threshold amount of time. For example, if the threshold is met, the UE 115-*b* may transmit according to a combination of the skipping information carried by the UCI and the cancellation information carried by the DCI.

Figure 9:
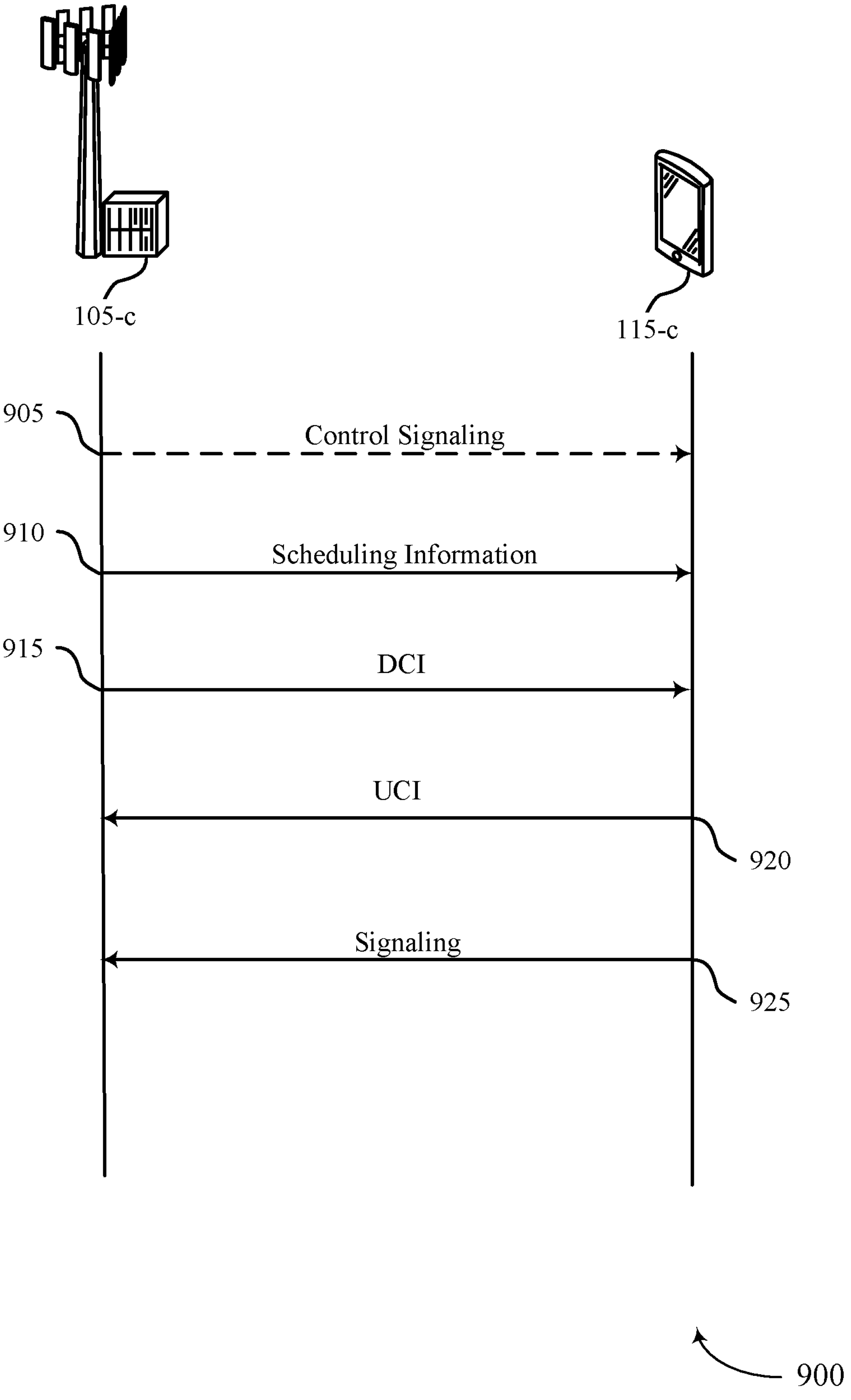
FIG. 9 illustrates an example of a process flow that supports wireless signaling based on downlink cancellation information and uplink skipping information in accordance with one or more aspects of the present disclosure.

FIG. 9 illustrates an example of a process flow 900 that supports wireless signaling based on downlink cancellation information and uplink skipping information in accordance with one or more aspects of the present disclosure. The process flow 900 may implement aspects of, or be implemented by aspects of, wireless communications system 100, wireless communications system 200, timeline 300, timeline 400, timeline 500, timeline 600, timeline 700, and process flow 800. For example, a network entity 105-*c*, and a UE 115-*c*, which may be examples of corresponding devices described with reference to wireless communications system 100 and wireless communications system 200, may communicate according to the process flow 900.

In the following description of the process flow 900, the operations between the UE 115-*c* and the network entity 105-*c* may be performed in different orders or at different times. Some operations may also be left out of the process flow 900, or other operations may be added. Although the UE 115-*c* and the network entity 105-*c* are shown performing the operations of the process flow 900, some aspects of some operations may also be performed by one or more other wireless devices.

At 905, the UE 115-*b* may receive control signaling indicating a transmission mode. For example, the control signaling may indicate a first transmission mode, a second transmission mode, or both, as described herein with reference to FIG. 5 and FIG. 6. The control signaling may indicate a transmission mode (e.g., a first transmission mode) associated with prioritizing the cancellation information (e.g., the DCI) over the skipping information (e.g., the UCI). In some examples, the control signaling may indicate a transmission mode (e.g., a second transmission mode) associated with a combination of the uplink cancellation information and the skipping information. The transmission of the uplink signaling at 925 may be based on the transmission mode. In some examples, the control signaling may be included in the scheduling information (e.g., at 910), or the DCI (e.g., transmitted at 915). In some examples, the control signaling may indicate the transmission mode based on an amount of time between transmission of the UCI and reception of the DCI.

At 910, the network entity 105-*b* may transmit scheduling information indicating a set of resources of a PUSCH allocated for uplink transmissions.

In some examples, the scheduling information may be included in a CG via RRC signaling including an indication of the set of resources, a DCI message activating the CG, or a combination thereof. In some examples, the scheduling information may be included in the DCI.

At 915, the network entity 105-*b* may transmit DCI including uplink cancellation information indicating a first subset of the set of resources of a PUSCH to remain unoccupied by transmissions by the UE.

At 920, the UE 115-*c* may transmit, based on the uplink cancelling information, UCI including skipping information indicating a second subset of the set of resources of a PUSCH to remain unoccupied by transmissions by the UE. In some examples, the UCI may include an indication of one or more additional resources with reference to the first subset of resources, where the one or more additional resources comprise the second subset of resources. The UE 115-*c* may determine that the one or more additional resources are to remain unoccupied based at least in part on an amount of data corresponding to the uplink signaling, wherein transmitting the UCI is based at least in part on the determining.

At 925, the UE 115-*c* may transmit uplink signaling via a portion of the set of resources of the PUSCH based on the UCI carrying the skipping information and the DCI indicating the uplink cancellation information, where the first subset of the set of resources and the second subset of the set of resources are unoccupied by the uplink signaling.

Figure 10:
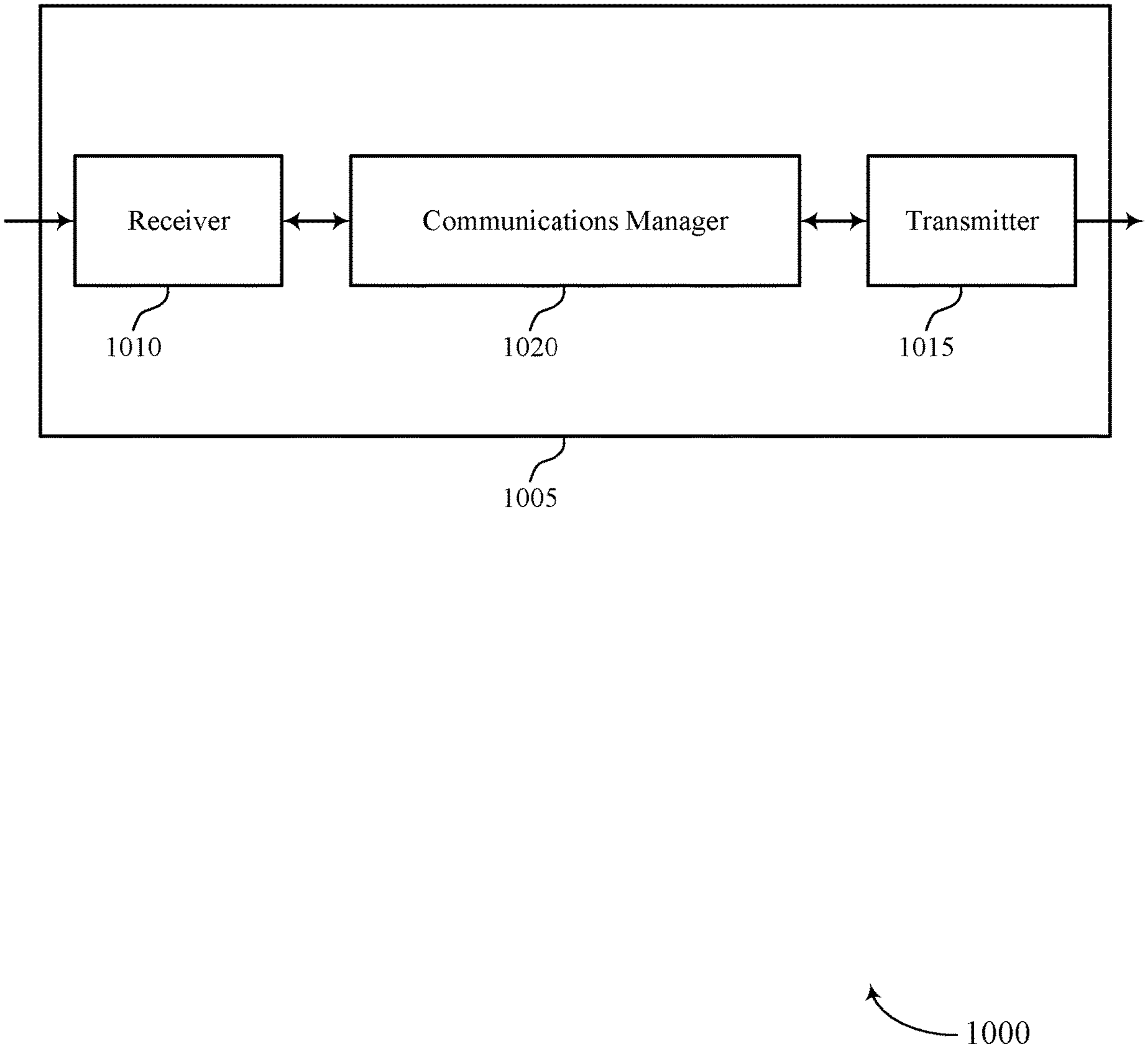
FIGS. 10 and 11 illustrate block diagrams of devices that support wireless signaling based on downlink cancellation information and uplink skipping information in accordance with one or more aspects of the present disclosure.

FIG. 10 illustrates a block diagram 1000 of a device 1005 that supports wireless signaling based on downlink cancellation information and uplink skipping information in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for receiving information such as packets, user data, control information, or any combination thereof associated with various information channels (e.g., control channels, data channels, information channels related to wireless signaling based on downlink cancellation information and uplink skipping information). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to wireless signaling based on downlink cancellation information and uplink skipping information). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of wireless signaling based on downlink cancellation information and uplink skipping information as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor (not shown). If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving scheduling information indicating a set of resources of a PUSCH allocated for uplink transmissions. The communications manager 1020 may be configured as or otherwise support a means for transmitting UCI including skipping information indicating a first subset of the set of resources of a PUSCH to remain unoccupied by transmissions by the UE. The communications manager 1020 may be configured as or otherwise support a means for receiving DCI including uplink cancellation information indicating a second subset of the set of resources of the PUSCH to remain unoccupied by transmissions by the UE. The communications manager 1020 may be configured as or otherwise support a means for transmitting uplink signaling via a portion of the set of resources of the PUSCH based on the UCI carrying the skipping information, the DCI indicating the uplink cancellation information, or both, where at least the second subset of the set of resources is unoccupied by the uplink signaling.

Additionally, or alternatively, the communications manager 1020 may support wireless communications at a UE in accordance with examples as disclosed herein. For example, the communications manager 1020 may be configured as or otherwise support a means for receiving scheduling information indicating a set of resources of a PUSCH allocated for uplink transmissions. The communications manager 1020 may be configured as or otherwise support a means for receiving DCI including uplink cancellation information indicating a first subset of the set of resources of a PUSCH to remain unoccupied by transmissions by the UE. The communications manager 1020 may be configured as or otherwise support a means for transmitting, based on the uplink cancellation information, UCI including skipping information indicating a second subset of the set of resources of a PUSCH to remain unoccupied by transmissions by the UE. The communications manager 1020 may be configured as or otherwise support a means for transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for wireless signaling based on downlink cancellation information and uplink skipping information, which may result in reduced processing, reduced power consumption, more efficient utilization of communication resources, and increased throughput, among other advantages.

Figure 11:
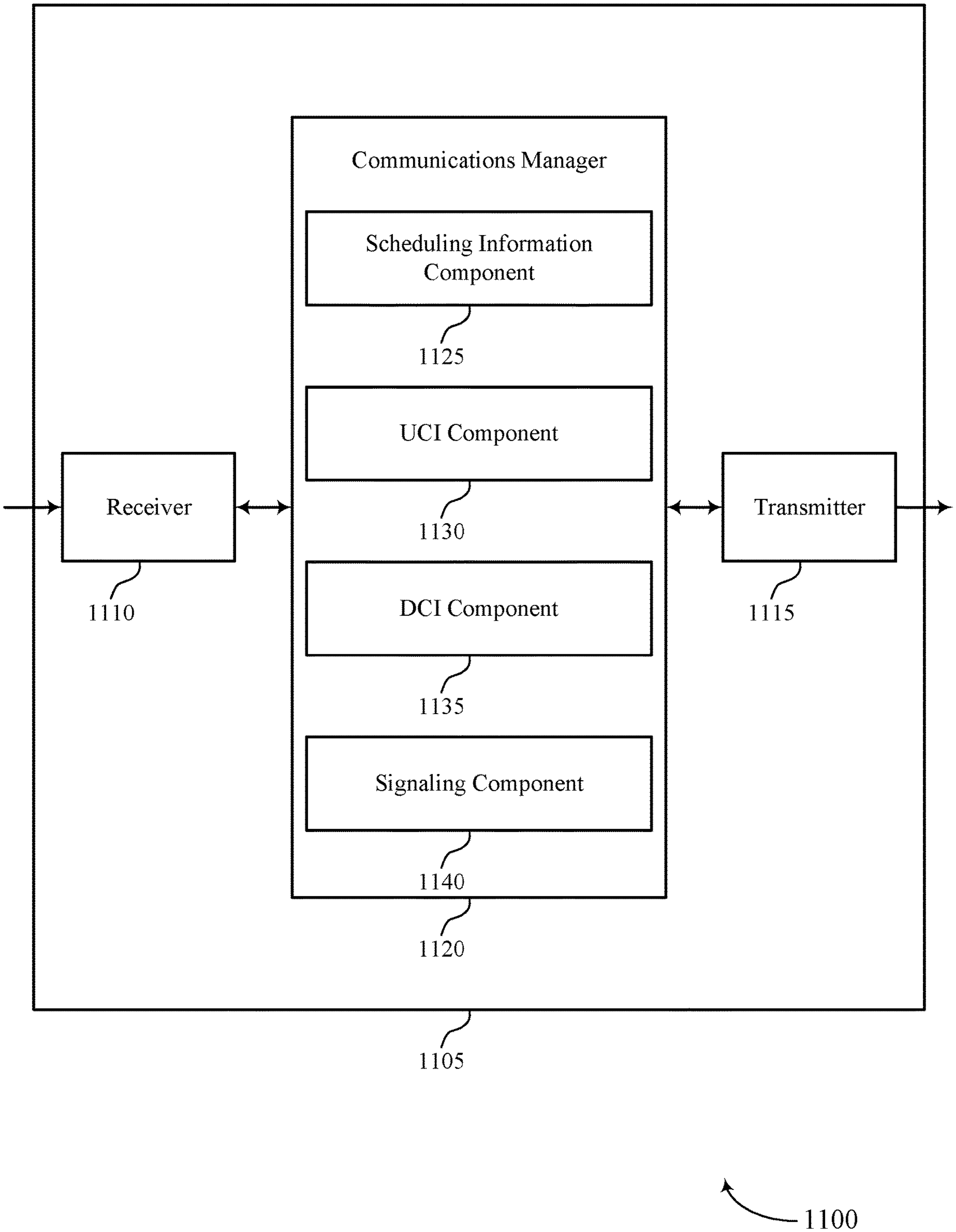

FIG. 11 illustrates a block diagram 1100 of a device 1105 that supports wireless signaling based on downlink cancellation information and uplink skipping information in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for receiving information such as packets, user data, control information, or any combination thereof associated with various information channels (e.g., control channels, data channels, information channels related to wireless signaling based on downlink cancellation information and uplink skipping information). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to wireless signaling based on downlink cancellation information and uplink skipping information). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of wireless signaling based on downlink cancellation information and uplink skipping information as described herein. For example, the communications manager 1120 may include a scheduling information component 1125, a UCI component 1130, a DCI component 1135, a signaling component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The scheduling information component 1125 may be configured as or otherwise support a means for receiving scheduling information indicating a set of resources of a PUSCH allocated for uplink transmissions. The UCI component 1130 may be configured as or otherwise support a means for transmitting UCI including skipping information indicating a first subset of the set of resources of a PUSCH to remain unoccupied by transmissions by the UE. The DCI component 1135 may be configured as or otherwise support a means for receiving DCI including uplink cancellation information indicating a second subset of the set of resources of the PUSCH to remain unoccupied by transmissions by the UE. The signaling component 1140 may be configured as or otherwise support a means for transmitting uplink signaling via a portion of the set of resources of the PUSCH based on the UCI carrying the skipping information, the DCI indicating the uplink cancellation information, or both, where at least the second subset of the set of resources is unoccupied by the uplink signaling.

Additionally, or alternatively, the communications manager 1120 may support wireless communications at a UE in accordance with examples as disclosed herein. The scheduling information component 1125 may be configured as or otherwise support a means for receiving scheduling information indicating a set of resources of a PUSCH allocated for uplink transmissions. The DCI component 1135 may be configured as or otherwise support a means for receiving DCI including uplink cancellation information indicating a first subset of the set of resources of a PUSCH to remain unoccupied by transmissions by the UE. The UCI component 1130 may be configured as or otherwise support a means for transmitting, based on the uplink cancellation information, UCI including skipping information indicating a second subset of the set of resources of a PUSCH to remain unoccupied by transmissions by the UE. The signaling component 1140 may be configured as or otherwise support a means for transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

Figure 12:
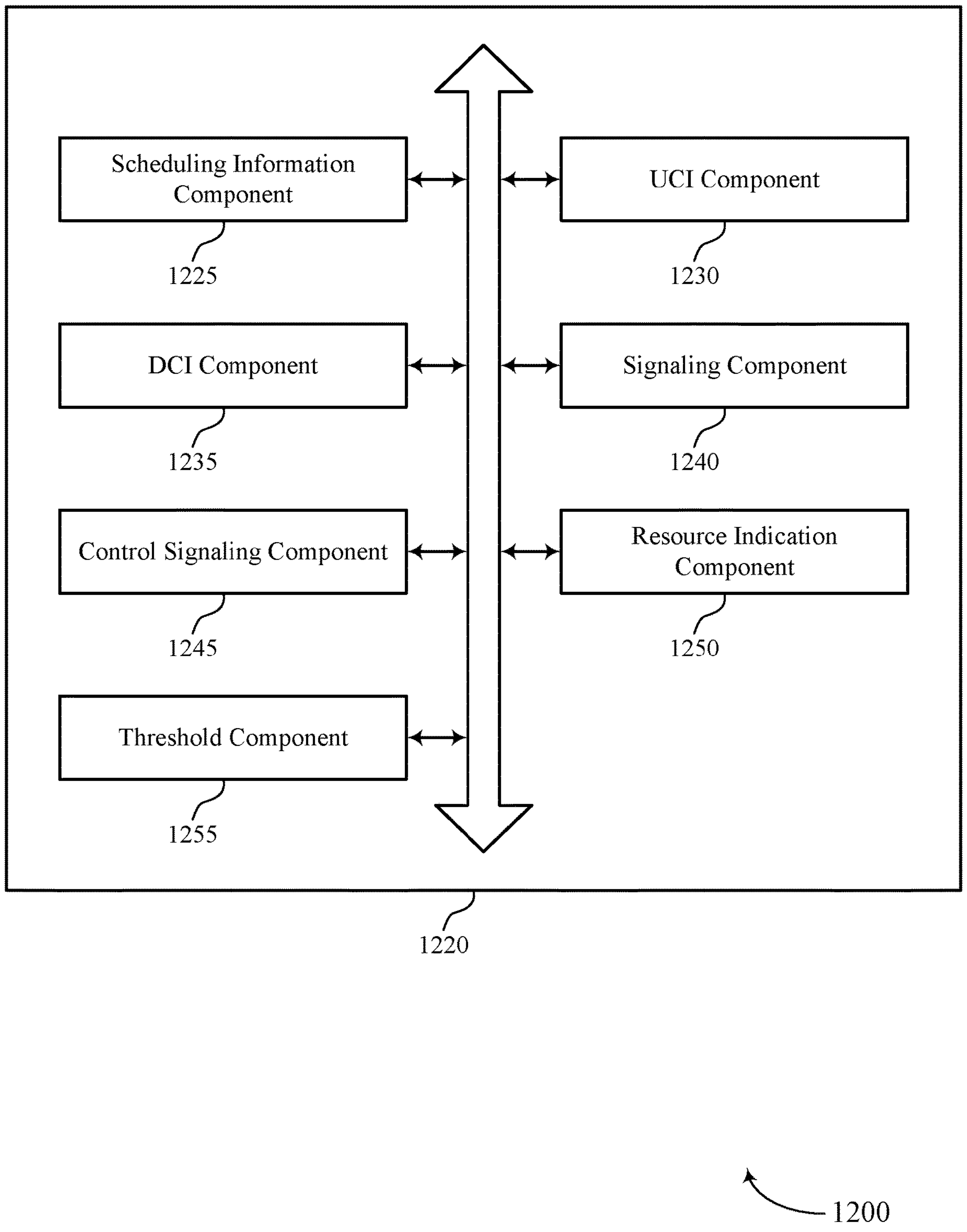
FIG. 12 illustrates a block diagram of a communications manager that supports wireless signaling based on downlink cancellation information and uplink skipping information in accordance with one or more aspects of the present disclosure.

FIG. 12 illustrates a block diagram 1200 of a communications manager 1220 that supports wireless signaling based on downlink cancellation information and uplink skipping information in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of wireless signaling based on downlink cancellation information and uplink skipping information as described herein. For example, the communications manager 1220 may include a scheduling information component 1225, a UCI component 1230, a DCI component 1235, a signaling component 1240, a control signaling component 1245, a resource indication component 1250, a threshold component 1255, or any combination thereof. Each of these components may communicate, directly or indirectly, with one another (e.g., via one or more buses).

The communications manager 1220 may support wireless communications at a UE in accordance with examples as disclosed herein. The scheduling information component 1225 may be configured as or otherwise support a means for receiving scheduling information indicating a set of resources of a PUSCH allocated for uplink transmissions. The UCI component 1230 may be configured as or otherwise support a means for transmitting UCI including skipping information indicating a first subset of the set of resources of a PUSCH to remain unoccupied by transmissions by the UE. The DCI component 1235 may be configured as or otherwise support a means for receiving DCI including uplink cancellation information indicating a second subset of the set of resources of the PUSCH to remain unoccupied by transmissions by the UE. The signaling component 1240 may be configured as or otherwise support a means for transmitting uplink signaling via a portion of the set of resources of the PUSCH based on the UCI carrying the skipping information, the DCI indicating the uplink cancellation information, or both, where at least the second subset of the set of resources is unoccupied by the uplink signaling.

In some examples, the control signaling component 1245 may be configured as or otherwise support a means for receiving control signaling indicating a transmission mode associated with prioritizing the cancellation information over the skipping information, where transmitting the uplink signaling is based on the transmission mode.

In some examples, to support transmitting the uplink signaling, the signaling component 1240 may be configured as or otherwise support a means for refraining from transmitting via the second subset of the set of resources based on overriding the skipping information according to the transmission mode. In some examples, to support transmitting the uplink signaling, the signaling component 1240 may be configured as or otherwise support a means for transmitting the uplink signaling via the first subset of the set of resources and a remainder of the set of resources according to the scheduling information and the uplink cancellation information.

In some examples, transmitting the uplink signaling according to the transmission mode associated with prioritizing the uplink cancellation information is based on transmitting the UCI prior to receiving the DCI. In some examples, an amount of time between transmitting the UCI and receiving the DCI does not satisfy a threshold amount of time.

In some examples, the control signaling component 1245 may be configured as or otherwise support a means for receiving control signaling indicating a transmission mode associated with a combination of the uplink cancellation information and the skipping information, where transmitting the uplink signaling is based on the transmission mode.

In some examples, the DCI component 1235 may be configured as or otherwise support a means for receiving, in the DCI, an indication of one or more additional resources with reference to the first subset of resources, where the one or more additional resources include the second subset of resources.

In some examples, to support transmitting the uplink signaling, the signaling component 1240 may be configured as or otherwise support a means for refraining from transmitting via the first subset of the set of resources and the second subset of the set of resources according to the transmission mode. In some examples, to support transmitting the uplink signaling, the signaling component 1240 may be configured as or otherwise support a means for transmitting the uplink signaling via a remainder of the set of resources.

In some examples, transmitting the uplink signaling according to the transmission mode associated with the combination of the uplink cancellation information and the skipping information is based on transmitting the UCI prior to receiving the DCI. In some examples, an amount of time between transmitting the UCI and receiving the DCI satisfies a threshold amount of time.

In some examples, to support receiving the scheduling information, the scheduling information component 1225 may be configured as or otherwise support a means for receiving RRC signaling including configuration information corresponding to one or more CGs corresponding to the set of resources, a DCI message activating the CG, or a combination thereof.

In some examples, to support receiving the scheduling information, the scheduling information component 1225 may be configured as or otherwise support a means for receiving a DCI message including the scheduling information.

Additionally, or alternatively, the communications manager 1220 may support wireless communications at a UE in accordance with examples as disclosed herein. In some examples, the scheduling information component 1225 may be configured as or otherwise support a means for receiving scheduling information indicating a set of resources of a PUSCH allocated for uplink transmissions. In some examples, the DCI component 1235 may be configured as or otherwise support a means for receiving DCI including uplink cancellation information indicating a first subset of the set of resources of a PUSCH to remain unoccupied by transmissions by the UE. In some examples, the UCI component 1230 may be configured as or otherwise support a means for transmitting, based on the uplink cancellation information, UCI including skipping information indicating a second subset of the set of resources of a PUSCH to remain unoccupied by transmissions by the UE. In some examples, the signaling component 1240 may be configured as or otherwise support a means for transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

In some examples, the resource indication component 1250 may be configured as or otherwise support a means for transmitting, in the UCI, an indication of one or more additional resources with reference to the first subset of resources, where the one or more additional resources include the second subset of resources.

In some examples, the UCI component 1230 may be configured as or otherwise support a means for determining that the one or more additional resources are to remain unoccupied based on an amount of data corresponding to the uplink signaling, where transmitting the UCI is based on the determining.

In some examples, to support receiving the scheduling information, the scheduling information component 1225 may be configured as or otherwise support a means for receiving a CG via RRC signaling including an indication of the set of resources, a DCI message activating the CG, or a combination thereof.

In some examples, to support receiving the scheduling information, the scheduling information component 1225 may be configured as or otherwise support a means for receiving a DCI message including the scheduling information.

Figure 13:
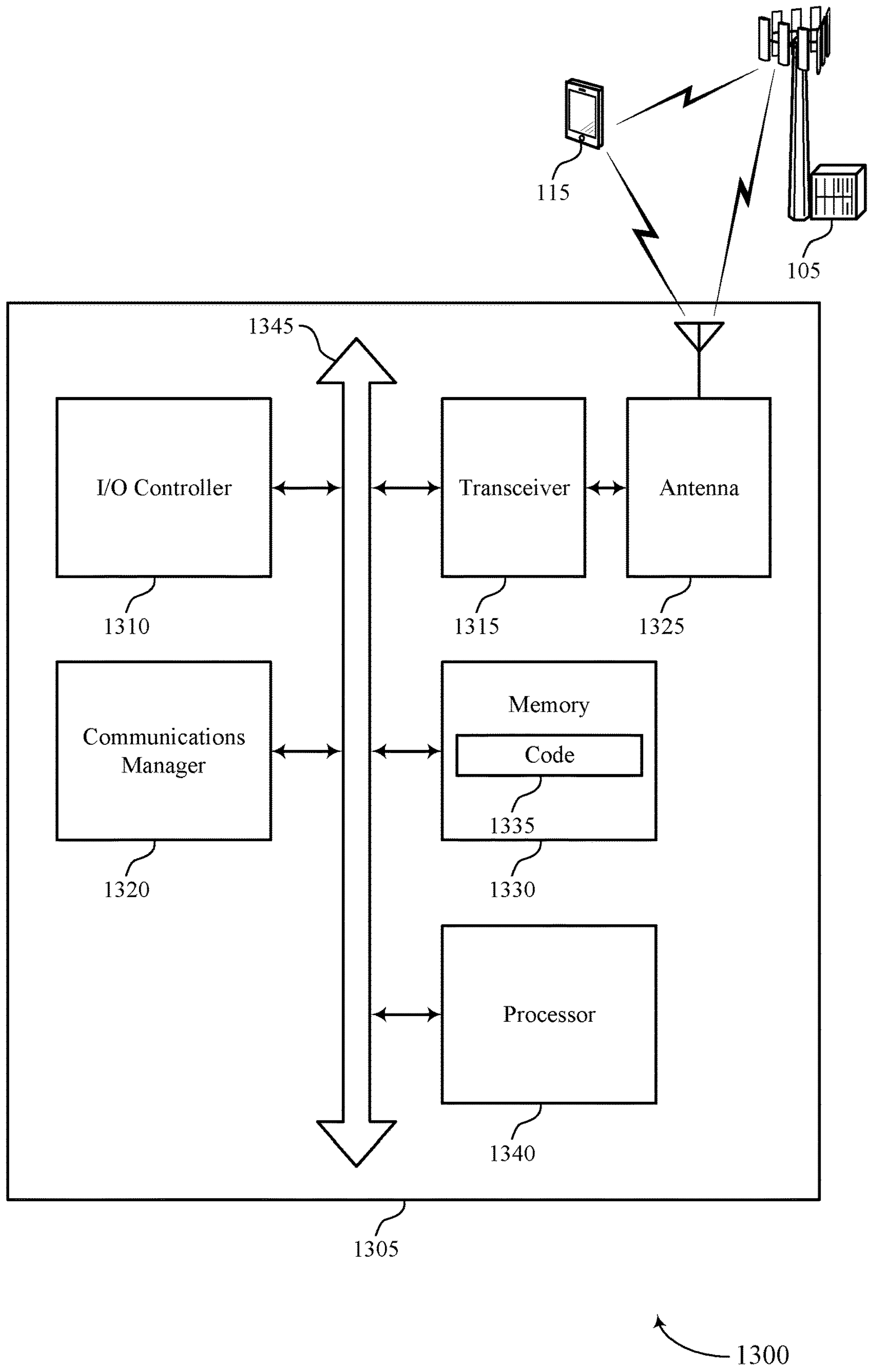
FIG. 13 illustrates a diagram of a system including a device that supports wireless signaling based on downlink cancellation information and uplink skipping information in accordance with one or more aspects of the present disclosure.

FIG. 13 illustrates a diagram of a system 1300 including a device 1305 that supports wireless signaling based on downlink cancellation information and uplink skipping information in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting wireless signaling based on downlink cancellation information and uplink skipping information). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving scheduling information indicating a set of resources of a PUSCH allocated for uplink transmissions. The communications manager 1320 may be configured as or otherwise support a means for transmitting UCI including skipping information indicating a first subset of the set of resources of a PUSCH to remain unoccupied by transmissions by the UE. The communications manager 1320 may be configured as or otherwise support a means for receiving DCI including uplink cancellation information indicating a second subset of the set of resources of the PUSCH to remain unoccupied by transmissions by the UE. The communications manager 1320 may be configured as or otherwise support a means for transmitting uplink signaling via a portion of the set of resources of the PUSCH based on the UCI carrying the skipping information, the DCI indicating the uplink cancellation information, or both, where at least the second subset of the set of resources is unoccupied by the uplink signaling.

Additionally, or alternatively, the communications manager 1320 may support wireless communications at a UE in accordance with examples as disclosed herein. For example, the communications manager 1320 may be configured as or otherwise support a means for receiving scheduling information indicating a set of resources of a PUSCH allocated for uplink transmissions. The communications manager 1320 may be configured as or otherwise support a means for receiving DCI including uplink cancellation information indicating a first subset of the set of resources of a PUSCH to remain unoccupied by transmissions by the UE. The communications manager 1320 may be configured as or otherwise support a means for transmitting, based on the uplink cancellation information, UCI including skipping information indicating a second subset of the set of resources of a PUSCH to remain unoccupied by transmissions by the UE. The communications manager 1320 may be configured as or otherwise support a means for transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

By including or configuring the communications manager 1320 in accordance with examples as described herein, the device 1305 may support techniques for wireless signaling based on downlink cancellation information and uplink skipping information, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of wireless signaling based on downlink cancellation information and uplink skipping information as described herein, or the processor 1340 and the memory 1330 may be otherwise configured to perform or support such operations.

Figure 14:
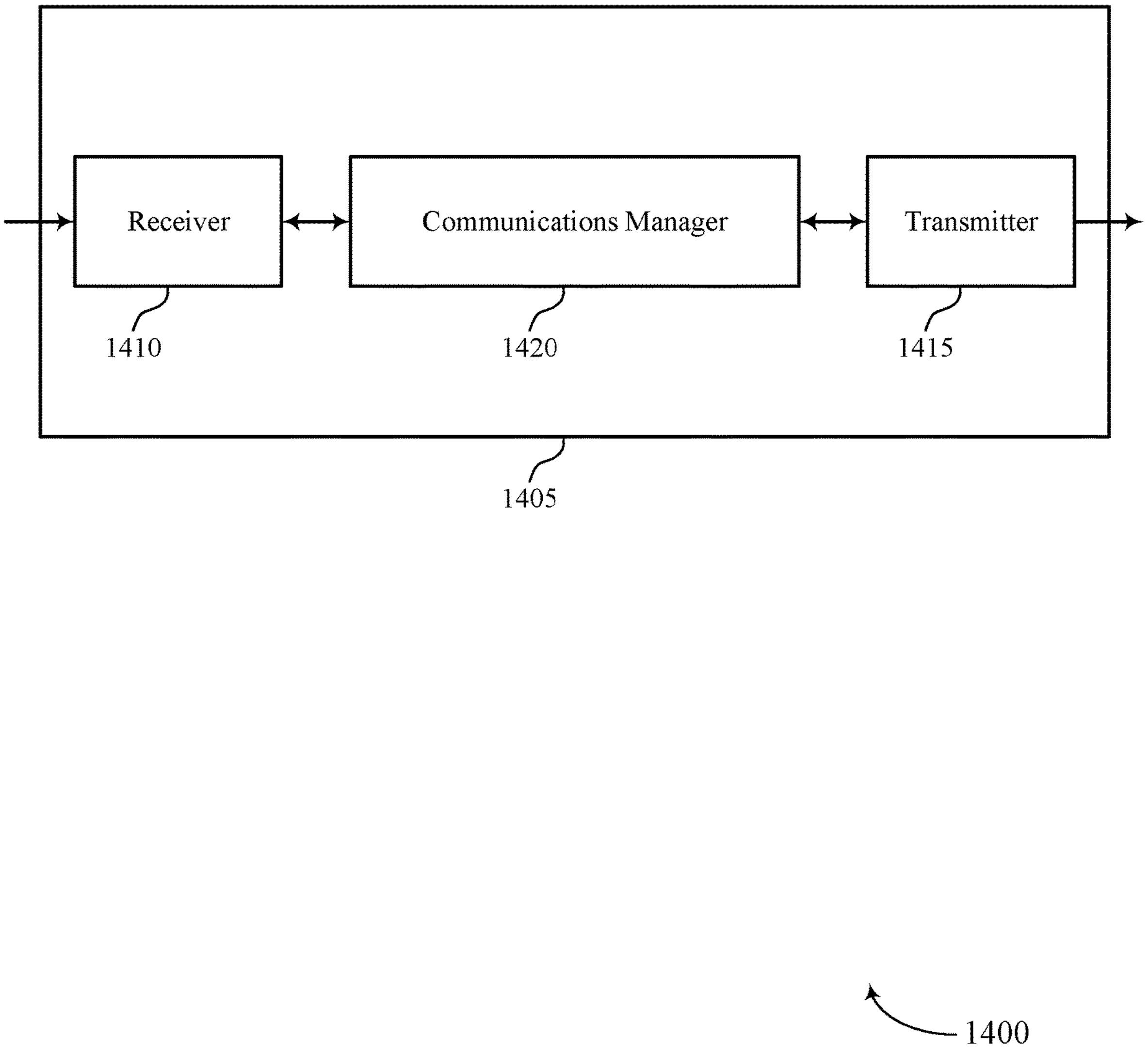
FIGS. 14 and 15 illustrate block diagrams of devices that support wireless signaling based on downlink cancellation information and uplink skipping information in accordance with one or more aspects of the present disclosure.

FIG. 14 illustrates a block diagram 1400 of a device 1405 that supports wireless signaling based on downlink cancellation information and uplink skipping information in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor (not shown). Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas (e.g., such as antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of wireless signaling based on downlink cancellation information and uplink skipping information as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor (not shown). If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for transmitting scheduling information indicating a set of resources of a PUSCH allocated for uplink transmissions by a UE. The communications manager 1420 may be configured as or otherwise support a means for receiving UCI including skipping information indicating a first subset of the set of resources of a PUSCH to remain unoccupied by transmissions by the UE. The communications manager 1420 may be configured as or otherwise support a means for transmitting DCI including uplink cancellation information indicating a second subset of the set of resources of a PUSCH to remain unoccupied by transmissions by the UE. The communications manager 1420 may be configured as or otherwise support a means for receiving uplink signaling via a portion of the set of resources of a PUSCH based on the UCI carrying the DCI indicating the skipping information, the uplink cancellation information, or both, where at least the second subset of the set of resources is unoccupied by the uplink signaling.

Additionally, or alternatively, the communications manager 1420 may support wireless communications at a network entity in accordance with examples as disclosed herein. For example, the communications manager 1420 may be configured as or otherwise support a means for transmitting scheduling information indicating a set of resources of a PUSCH allocated for uplink transmissions by a UE. The communications manager 1420 may be configured as or otherwise support a means for transmitting, to the UE, DCI including uplink cancellation information indicating a first subset of the set of resources of a PUSCH to remain unoccupied by transmissions by the UE. The communications manager 1420 may be configured as or otherwise support a means for receiving, based on the uplink cancellation information, UCI including skipping information indicating a second subset of the set of resources of a PUSCH to remain unoccupied by transmissions by the UE. The communications manager 1420 may be configured as or otherwise support a means for receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for wireless signaling based on downlink cancellation information and uplink skipping information, which may result in reduced processing, reduced power consumption, more efficient utilization of communication resources, and increased throughput, among other advantages.

Figure 15:
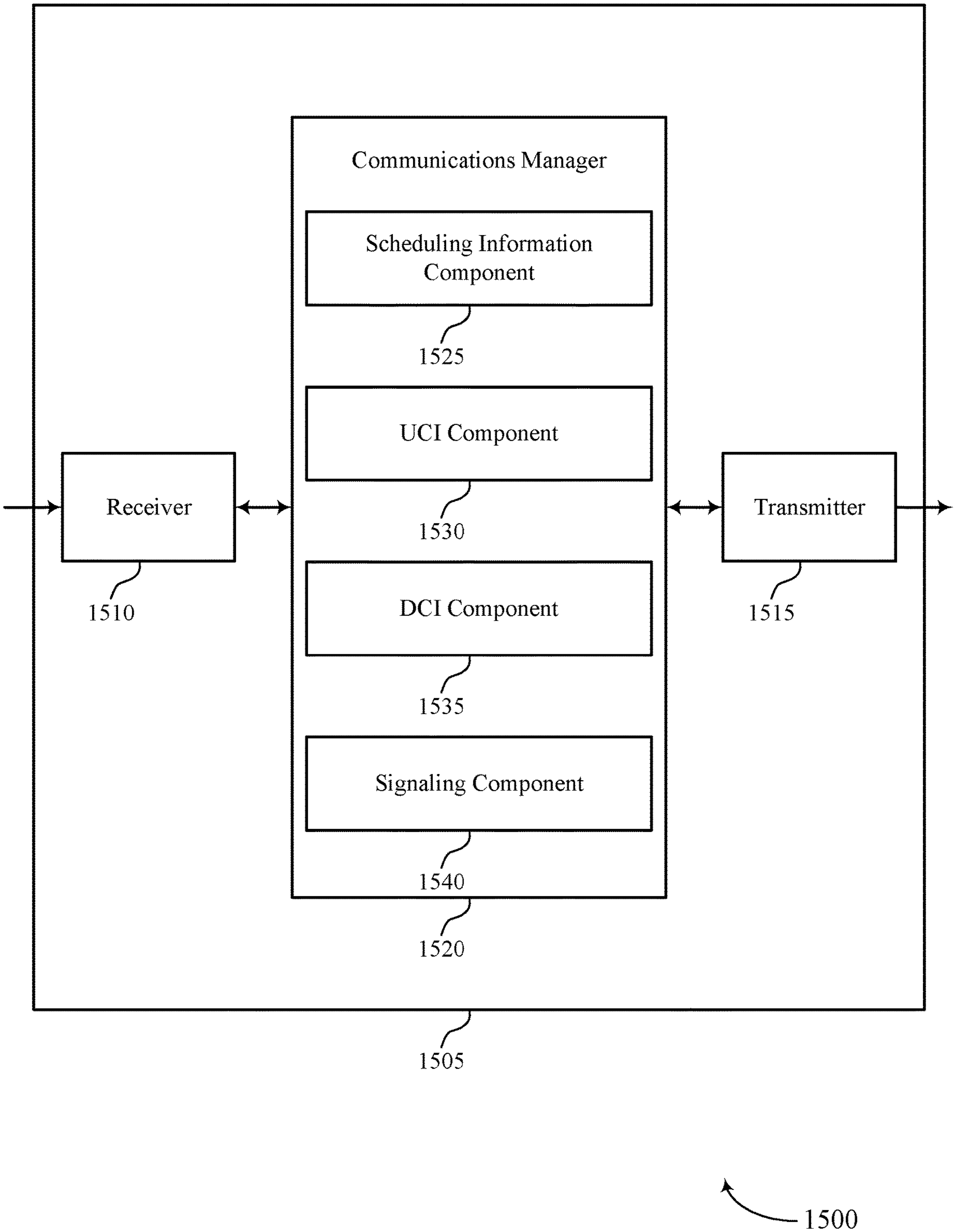

FIG. 15 illustrates a block diagram 1500 of a device 1505 that supports wireless signaling based on downlink cancellation information and uplink skipping information in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor (not shown). Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of wireless signaling based on downlink cancellation information and uplink skipping information as described herein. For example, the communications manager 1520 may include a scheduling information component 1525, a UCI component 1530, a DCI component 1535, a signaling component 1540, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The scheduling information component 1525 may be configured as or otherwise support a means for transmitting scheduling information indicating a set of resources of a PUSCH allocated for uplink transmissions by a UE. The UCI component 1530 may be configured as or otherwise support a means for receiving UCI including skipping information indicating a first subset of the set of resources of a PUSCH to remain unoccupied by transmissions by the UE. The DCI component 1535 may be configured as or otherwise support a means for transmitting DCI including uplink cancellation information indicating a second subset of the set of resources of a PUSCH to remain unoccupied by transmissions by the UE. The signaling component 1540 may be configured as or otherwise support a means for receiving uplink signaling via a portion of the set of resources of a PUSCH based on the UCI carrying the DCI indicating the skipping information, the uplink cancellation information, or both, where at least the second subset of the set of resources is unoccupied by the uplink signaling.

Additionally, or alternatively, the communications manager 1520 may support wireless communications at a network entity in accordance with examples as disclosed herein. The scheduling information component 1525 may be configured as or otherwise support a means for transmitting scheduling information indicating a set of resources of a PUSCH allocated for uplink transmissions by a UE. The DCI component 1535 may be configured as or otherwise support a means for transmitting, to the UE, DCI including uplink cancellation information indicating a first subset of the set of resources of a PUSCH to remain unoccupied by transmissions by the UE. The UCI component 1530 may be configured as or otherwise support a means for receiving, based on the uplink cancellation information, UCI including skipping information indicating a second subset of the set of resources of a PUSCH to remain unoccupied by transmissions by the UE. The signaling component 1540 may be configured as or otherwise support a means for receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

Figure 16:
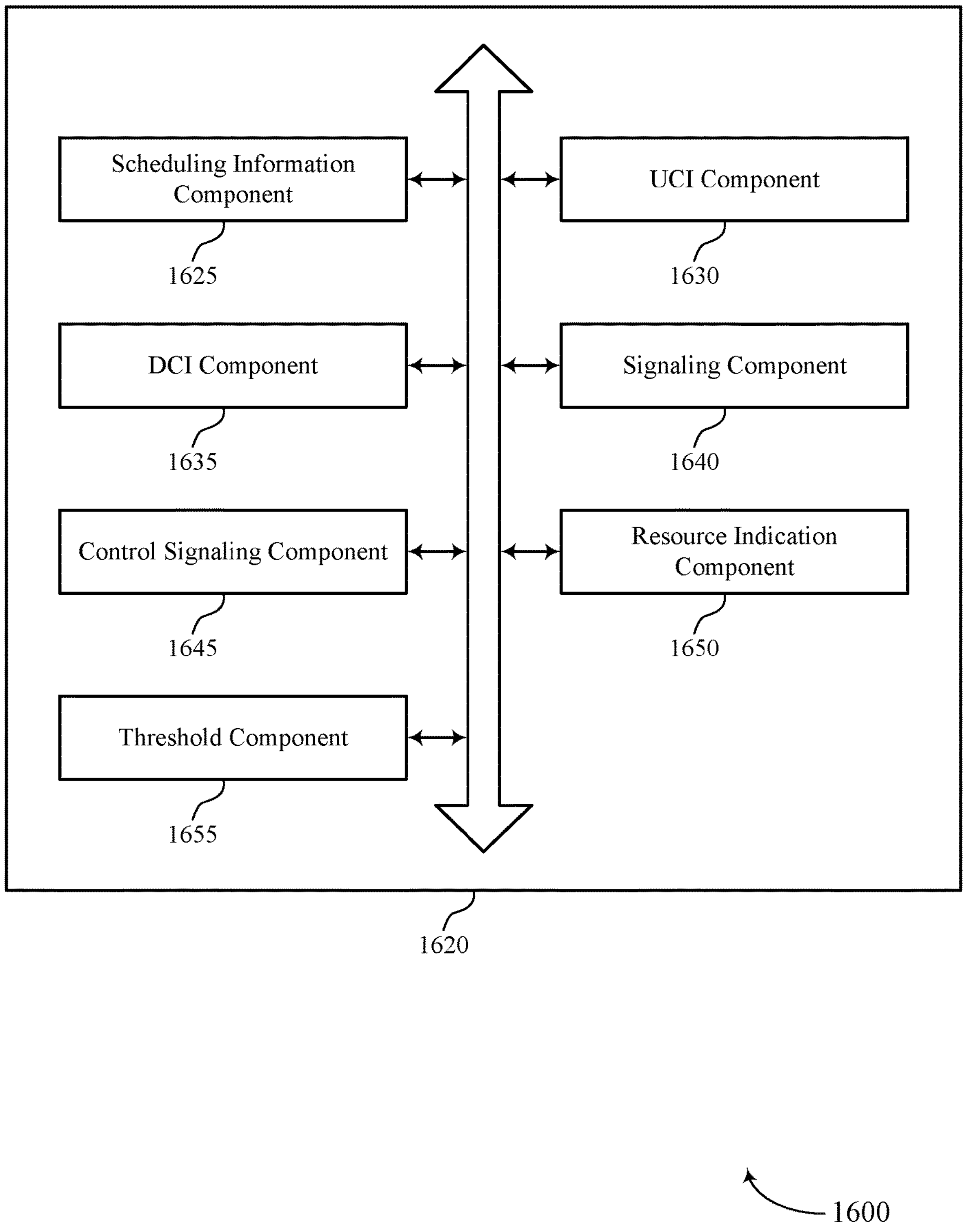
FIG. 16 illustrates a block diagram of a communications manager that supports wireless signaling based on downlink cancellation information and uplink skipping information in accordance with one or more aspects of the present disclosure.

FIG. 16 illustrates a block diagram 1600 of a communications manager 1620 that supports wireless signaling based on downlink cancellation information and uplink skipping information in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of wireless signaling based on downlink cancellation information and uplink skipping information as described herein. For example, the communications manager 1620 may include a scheduling information component 1625, a UCI component 1630, a DCI component 1635, a signaling component 1640, a control signaling component 1645, a resource indication component 1650, a threshold component 1655, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The scheduling information component 1625 may be configured as or otherwise support a means for transmitting scheduling information indicating a set of resources of a PUSCH allocated for uplink transmissions by a UE. The UCI component 1630 may be configured as or otherwise support a means for receiving UCI including skipping information indicating a first subset of the set of resources of a PUSCH to remain unoccupied by transmissions by the UE. The DCI component 1635 may be configured as or otherwise support a means for transmitting DCI including uplink cancellation information indicating a second subset of the set of resources of a PUSCH to remain unoccupied by transmissions by the UE. The signaling component 1640 may be configured as or otherwise support a means for receiving uplink signaling via a portion of the set of resources of a PUSCH based on the UCI carrying the DCI indicating the skipping information, the uplink cancellation information, or both, where at least the second subset of the set of resources is unoccupied by the uplink signaling.

In some examples, the control signaling component 1645 may be configured as or otherwise support a means for transmitting, to the UE, control signaling indicating a transmission mode associated with prioritizing the uplink cancellation information over the skipping information, where receiving the uplink signaling is based on the transmission mode.

In some examples, to support receiving the uplink signaling, the signaling component 1640 may be configured as or otherwise support a means for receiving the uplink signaling via the first subset of the set of resources according to the scheduling information and the uplink cancellation information, where the second subset of the set of resources remains unoccupied by transmission from the UE according to the transmission mode associated with prioritizing the uplink cancellation information over the skipping information.

In some examples, receiving the uplink signaling according to the transmission mode associated with prioritizing the uplink cancellation information is based on receiving the UCI prior to transmitting the DCI. In some examples, an amount of time between receiving the UCI and transmitting the DCI does not satisfy a threshold amount of time.

In some examples, the control signaling component 1645 may be configured as or otherwise support a means for transmitting control signaling indicating a transmission mode associated with a combination of the uplink cancellation information and the skipping information, where transmitting the uplink signaling is based on the transmission mode.

In some examples, the DCI component 1635 may be configured as or otherwise support a means for transmitting, in the DCI, an indication of one or more additional resources with reference to the first subset of resources, where the one or more additional resources include the second subset of resources.

In some examples, to support receiving the uplink signaling, the signaling component 1640 may be configured as or otherwise support a means for refraining from monitoring the first subset of the set of resources and the second subset of the second resources according to the transmission mode. In some examples, to support receiving the uplink signaling, the signaling component 1640 may be configured as or otherwise support a means for receiving the uplink signaling via a remainder of the set of resources.

In some examples, receiving the uplink signaling according to the transmission mode associated with the combination of the uplink cancellation information and the skipping information is based on receiving the UCI prior to transmitting the DCI. In some examples, an amount of time between receiving the UCI and transmitting the DCI satisfies a threshold amount of time.

In some examples, to support transmitting the scheduling information, the scheduling information component 1625 may be configured as or otherwise support a means for transmitting RRC signaling including configuration information corresponding to one or more CGs corresponding to the set of resources, a DCI message activating the CG, or a combination thereof.

In some examples, to support transmitting the scheduling information, the scheduling information component 1625 may be configured as or otherwise support a means for transmitting a DCI message including the scheduling information.

Additionally, or alternatively, the communications manager 1620 may support wireless communications at a network entity in accordance with examples as disclosed herein. In some examples, the scheduling information component 1625 may be configured as or otherwise support a means for transmitting scheduling information indicating a set of resources of a PUSCH allocated for uplink transmissions by a UE. In some examples, the DCI component 1635 may be configured as or otherwise support a means for transmitting, to the UE, DCI including uplink cancellation information indicating a first subset of the set of resources of a PUSCH to remain unoccupied by transmissions by the UE. In some examples, the UCI component 1630 may be configured as or otherwise support a means for receiving, based on the uplink cancellation information, UCI including skipping information indicating a second subset of the set of resources of a PUSCH to remain unoccupied by transmissions by the UE. In some examples, the signaling component 1640 may be configured as or otherwise support a means for receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

In some examples, the resource indication component 1650 may be configured as or otherwise support a means for receiving, in the UCI, an indication of one or more additional resources with reference to the first subset of resources, where the one or more additional resources include the second subset of resources.

In some examples, the signaling component 1640 may be configured as or otherwise support a means for communicating, via at least the first subset of the set of resources, high priority wireless signaling.

In some examples, to support transmitting the scheduling information, the scheduling information component 1625 may be configured as or otherwise support a means for transmitting a CG via RRC signaling including an indication of the set of resources, a DCI message activating the CG, or a combination thereof.

In some examples, to support transmitting the scheduling information, the scheduling information component 1625 may be configured as or otherwise support a means for transmitting a DCI message including the scheduling information.

Figure 17:
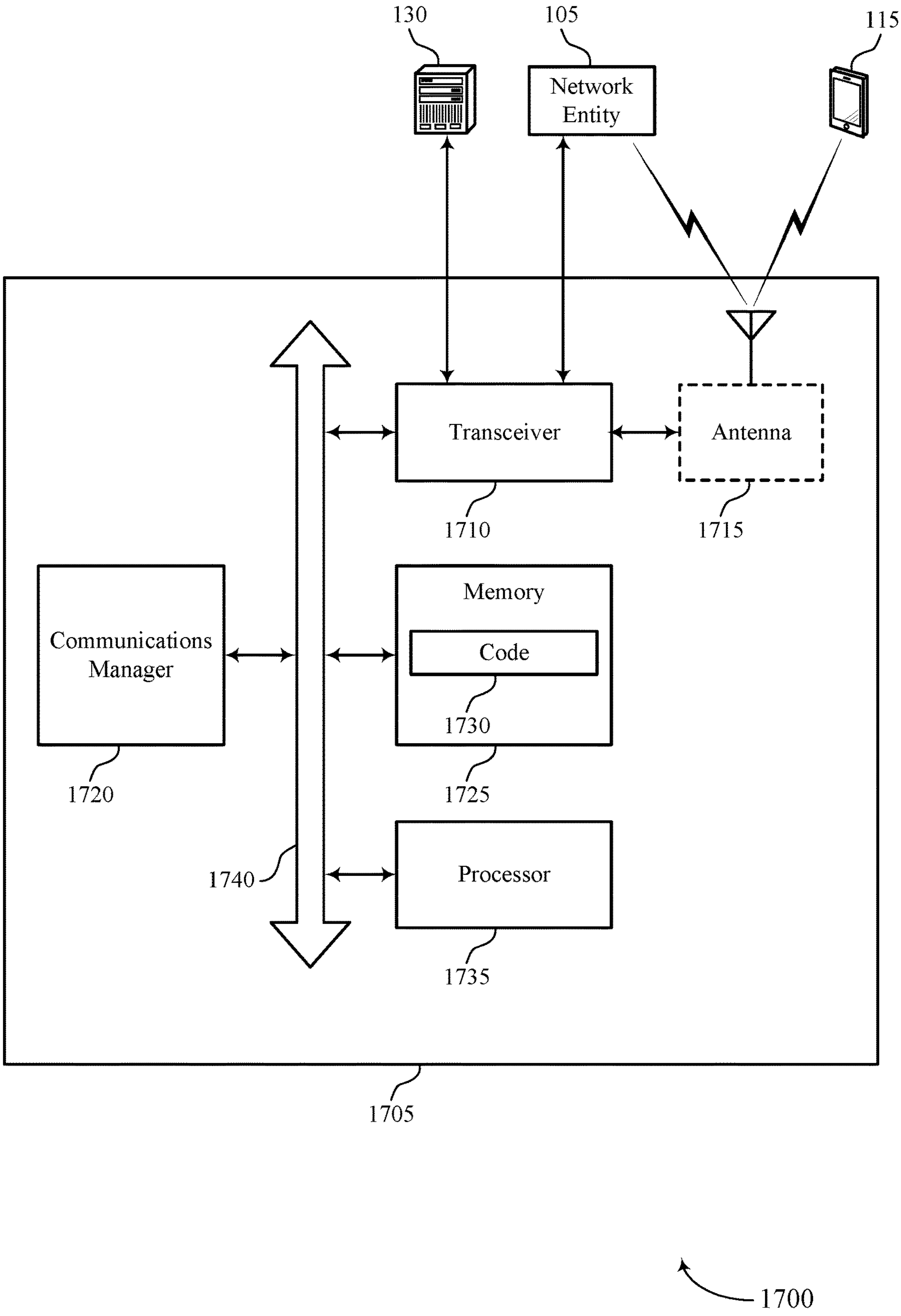
FIG. 17 illustrates a diagram of a system including a device that supports wireless signaling based on downlink cancellation information and uplink skipping information in accordance with one or more aspects of the present disclosure.

FIG. 17 illustrates a diagram of a system 1700 including a device 1705 that supports wireless signaling based on downlink cancellation information and uplink skipping information in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting wireless signaling based on downlink cancellation information and uplink skipping information). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for transmitting scheduling information indicating a set of resources of a PUSCH allocated for uplink transmissions by a UE. The communications manager 1720 may be configured as or otherwise support a means for receiving UCI including skipping information indicating a first subset of the set of resources of a PUSCH to remain unoccupied by transmissions by the UE. The communications manager 1720 may be configured as or otherwise support a means for transmitting DCI including uplink cancellation information indicating a second subset of the set of resources of a PUSCH to remain unoccupied by transmissions by the UE. The communications manager 1720 may be configured as or otherwise support a means for receiving uplink signaling via a portion of the set of resources of a PUSCH based on the UCI carrying the DCI indicating the skipping information, the uplink cancellation information, or both, where at least the second subset of the set of resources is unoccupied by the uplink signaling.

Additionally, or alternatively, the communications manager 1720 may support wireless communications at a network entity in accordance with examples as disclosed herein. For example, the communications manager 1720 may be configured as or otherwise support a means for transmitting scheduling information indicating a set of resources of a PUSCH allocated for uplink transmissions by a UE. The communications manager 1720 may be configured as or otherwise support a means for transmitting, to the UE, DCI including uplink cancellation information indicating a first subset of the set of resources of a PUSCH to remain unoccupied by transmissions by the UE. The communications manager 1720 may be configured as or otherwise support a means for receiving, based on the uplink cancellation information, UCI including skipping information indicating a second subset of the set of resources of a PUSCH to remain unoccupied by transmissions by the UE. The communications manager 1720 may be configured as or otherwise support a means for receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling.

By including or configuring the communications manager 1720 in accordance with examples as described herein, the device 1705 may support techniques for wireless signaling based on downlink cancellation information and uplink skipping information, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of wireless signaling based on downlink cancellation information and uplink skipping information as described herein, or the processor 1735 and the memory 1725 may be otherwise configured to perform or support such operations.

Figure 18:
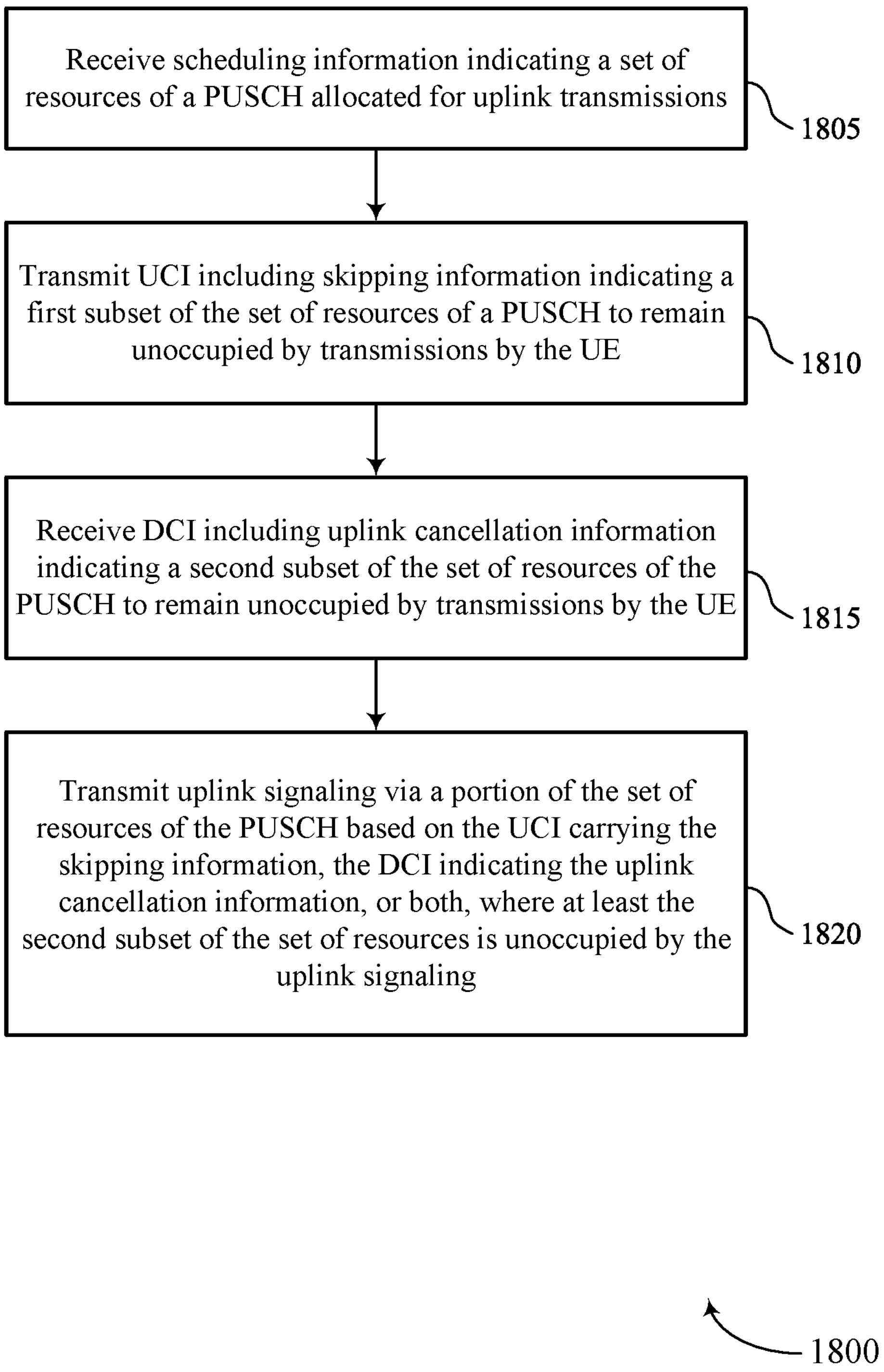
FIGS. 18 through 25 illustrate flowcharts showing methods that support wireless signaling based on downlink cancellation information and uplink skipping information in accordance with one or more aspects of the present disclosure.

FIG. 18 illustrates a flowchart showing a method 1800 that supports wireless signaling based on downlink cancellation information and uplink skipping information in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving scheduling information indicating a set of resources of a PUSCH allocated for uplink transmissions. The operations of 1805 may be performed in accordance with examples as disclosed herein. In some examples, aspects of the operations of 1805 may be performed by a scheduling information component 1225 as described herein with reference to FIG. 12.

At 1810, the method may include transmitting UCI including skipping information indicating a first subset of the set of resources of a PUSCH to remain unoccupied by transmissions by the UE. The operations of 1810 may be performed in accordance with examples as disclosed herein. In some examples, aspects of the operations of 1810 may be performed by a UCI component 1230 as described herein with reference to FIG. 12.

At 1815, the method may include receiving DCI including uplink cancellation information indicating a second subset of the set of resources of the PUSCH to remain unoccupied by transmissions by the UE. The operations of 1815 may be performed in accordance with examples as disclosed herein. In some examples, aspects of the operations of 1815 may be performed by a DCI component 1235 as described herein with reference to FIG. 12.

At 1820, the method may include transmitting uplink signaling via a portion of the set of resources of the PUSCH based on the UCI carrying the skipping information, the DCI indicating the uplink cancellation information, or both, where at least the second subset of the set of resources is unoccupied by the uplink signaling. The operations of 1820 may be performed in accordance with examples as disclosed herein. In some examples, aspects of the operations of 1820 may be performed by a signaling component 1240 as described herein with reference to FIG. 12.

Figure 19:
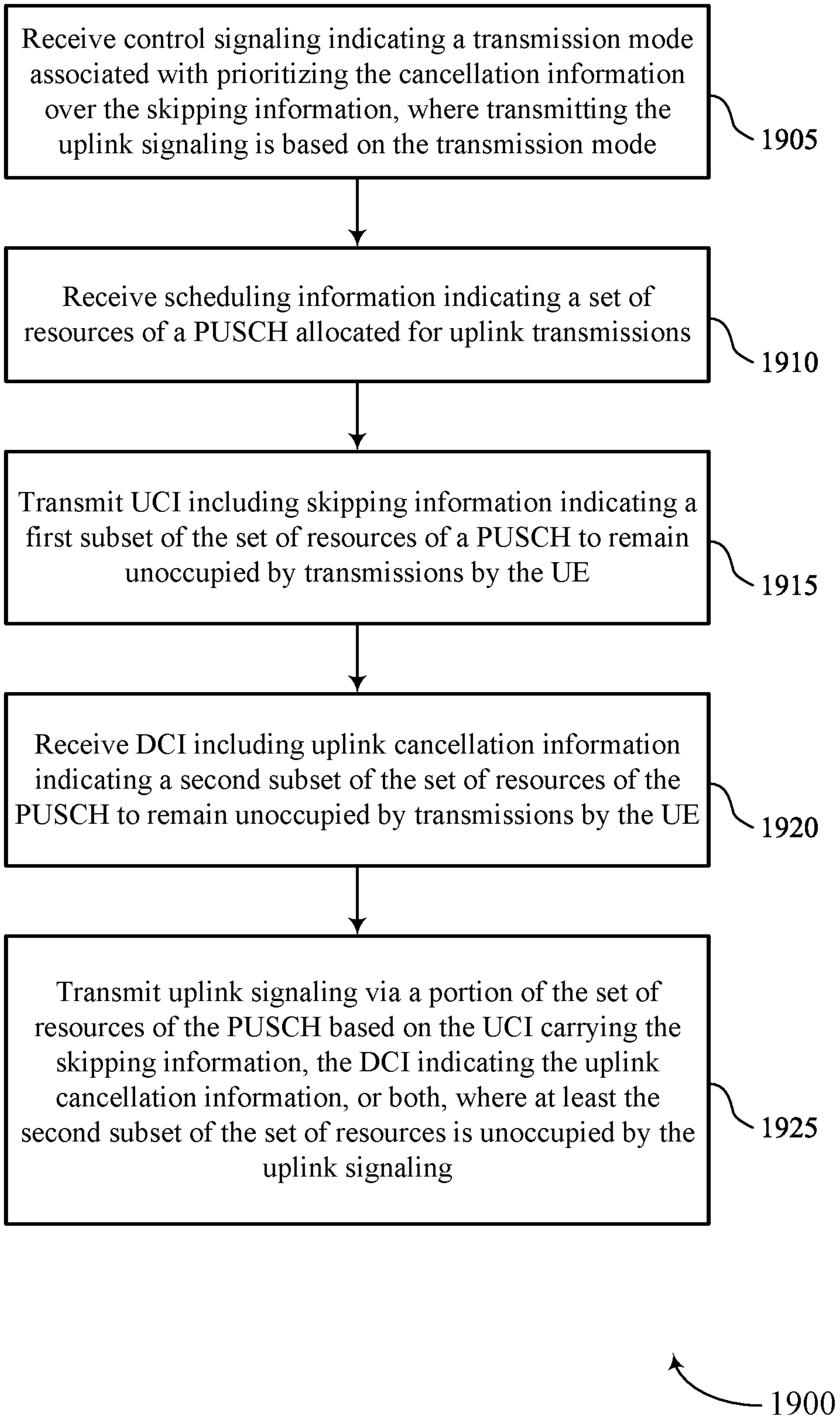

FIG. 19 illustrates a flowchart showing a method 1900 that supports wireless signaling based on downlink cancellation information and uplink skipping information in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving control signaling indicating a transmission mode associated with prioritizing the cancellation information over the skipping information, where transmitting the uplink signaling is based on the transmission mode. The operations of 1905 may be performed in accordance with examples as disclosed herein. In some examples, aspects of the operations of 1905 may be performed by a control signaling component 1245 as described herein with reference to FIG. 12.

At 1910, the method may include receiving scheduling information indicating a set of resources of a PUSCH allocated for uplink transmissions. The operations of 1910 may be performed in accordance with examples as disclosed herein. In some examples, aspects of the operations of 1910 may be performed by a scheduling information component 1225 as described herein with reference to FIG. 12.

At 1915, the method may include transmitting UCI including skipping information indicating a first subset of the set of resources of a PUSCH to remain unoccupied by transmissions by the UE. The operations of 1915 may be performed in accordance with examples as disclosed herein. In some examples, aspects of the operations of 1915 may be performed by a UCI component 1230 as described herein with reference to FIG. 12.

At 1920, the method may include receiving DCI including uplink cancellation information indicating a second subset of the set of resources of the PUSCH to remain unoccupied by transmissions by the UE. The operations of 1920 may be performed in accordance with examples as disclosed herein. In some examples, aspects of the operations of 1920 may be performed by a DCI component 1235 as described herein with reference to FIG. 12.

At 1925, the method may include transmitting uplink signaling via a portion of the set of resources of the PUSCH based on the UCI carrying the skipping information, the DCI indicating the uplink cancellation information, or both, where at least the second subset of the set of resources is unoccupied by the uplink signaling. The operations of 1925 may be performed in accordance with examples as disclosed herein. In some examples, aspects of the operations of 1925 may be performed by a signaling component 1240 as described herein with reference to FIG. 12.

Figure 20:
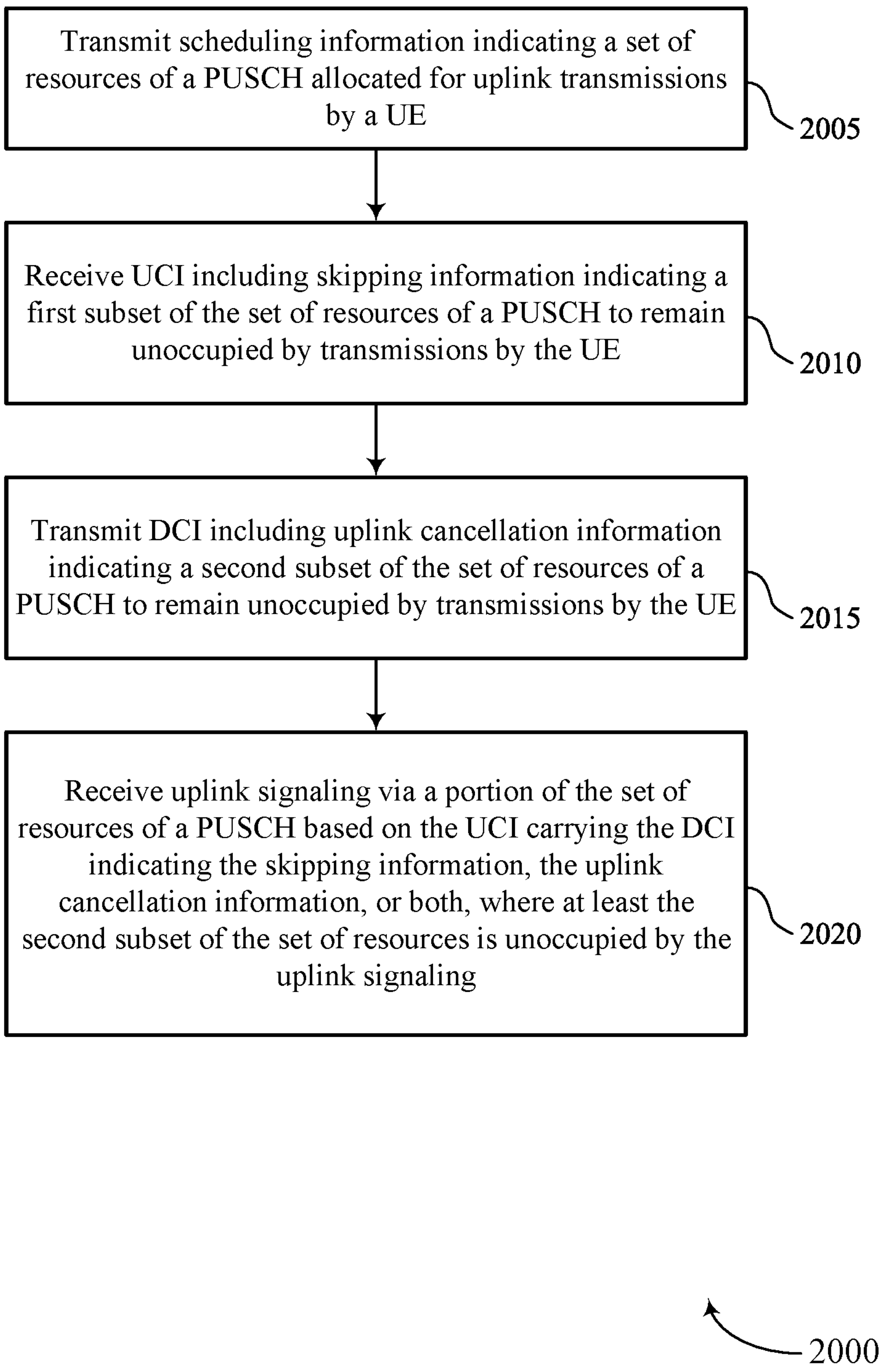

FIG. 20 illustrates a flowchart showing a method 2000 that supports wireless signaling based on downlink cancellation information and uplink skipping information in accordance with one or more aspects of the present disclosure. The operations of the method 2000 may be implemented by a network entity or its components as described herein. For example, the operations of the method 2000 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2005, the method may include transmitting scheduling information indicating a set of resources of a PUSCH allocated for uplink transmissions by a UE. The operations of 2005 may be performed in accordance with examples as disclosed herein. In some examples, aspects of the operations of 2005 may be performed by a scheduling information component 1625 as described herein with reference to FIG. 16.

At 2010, the method may include receiving UCI including skipping information indicating a first subset of the set of resources of a PUSCH to remain unoccupied by transmissions by the UE. The operations of 2010 may be performed in accordance with examples as disclosed herein. In some examples, aspects of the operations of 2010 may be performed by a UCI component 1630 as described herein with reference to FIG. 16.

At 2015, the method may include transmitting DCI including uplink cancellation information indicating a second subset of the set of resources of a PUSCH to remain unoccupied by transmissions by the UE. The operations of 2015 may be performed in accordance with examples as disclosed herein. In some examples, aspects of the operations of 2015 may be performed by a DCI component 1635 as described herein with reference to FIG. 16.

At 2020, the method may include receiving uplink signaling via a portion of the set of resources of a PUSCH based on the UCI carrying the DCI indicating the skipping information, the uplink cancellation information, or both, where at least the second subset of the set of resources is unoccupied by the uplink signaling. The operations of 2020 may be performed in accordance with examples as disclosed herein. In some examples, aspects of the operations of 2020 may be performed by a signaling component 1640 as described herein with reference to FIG. 16.

Figure 21:
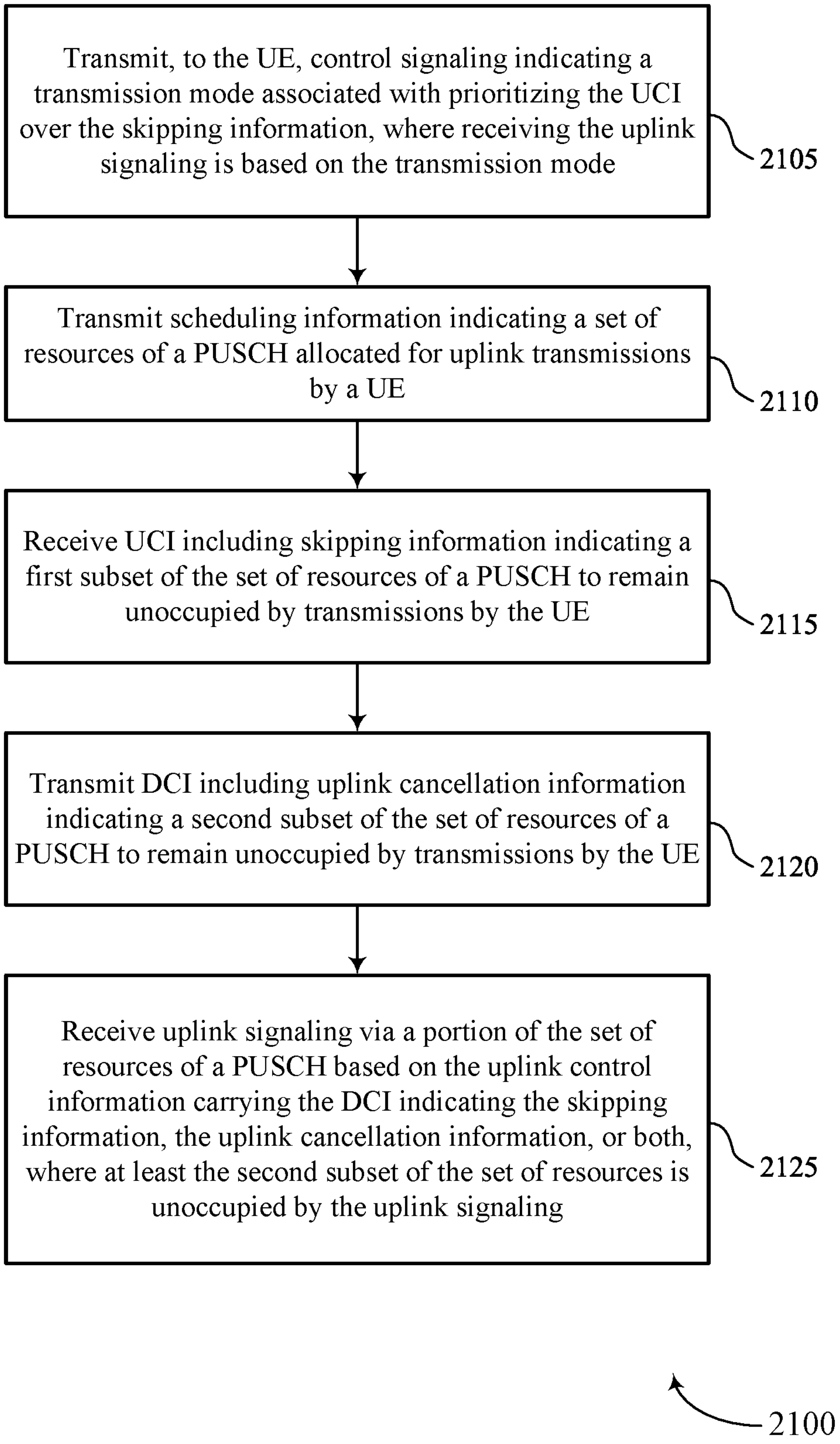

FIG. 21 illustrates a flowchart showing a method 2100 that supports wireless signaling based on downlink cancellation information and uplink skipping information in accordance with one or more aspects of the present disclosure. The operations of the method 2100 may be implemented by a network entity or its components as described herein. For example, the operations of the method 2100 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, to the UE, control signaling indicating a transmission mode associated with prioritizing the uplink cancellation information over the skipping information, where receiving the uplink signaling is based on the transmission mode. The operations of 2105 may be performed in accordance with examples as disclosed herein. In some examples, aspects of the operations of 2105 may be performed by a control signaling component 1645 as described herein with reference to FIG. 16.

At 2110, the method may include transmitting scheduling information indicating a set of resources of a PUSCH allocated for uplink transmissions by a UE. The operations of 2110 may be performed in accordance with examples as disclosed herein. In some examples, aspects of the operations of 2110 may be performed by a scheduling information component 1625 as described herein with reference to FIG. 16.

At 2115, the method may include receiving UCI including skipping information indicating a first subset of the set of resources of a PUSCH to remain unoccupied by transmissions by the UE. The operations of 2115 may be performed in accordance with examples as disclosed herein. In some examples, aspects of the operations of 2115 may be performed by a UCI component 1630 as described herein with reference to FIG. 16.

At 2120, the method may include transmitting DCI including uplink cancellation information indicating a second subset of the set of resources of a PUSCH to remain unoccupied by transmissions by the UE. The operations of 2120 may be performed in accordance with examples as disclosed herein. In some examples, aspects of the operations of 2120 may be performed by a DCI component 1635 as described herein with reference to FIG. 16.

At 2125, the method may include receiving uplink signaling via a portion of the set of resources of a PUSCH based on the UCI carrying the DCI indicating the skipping information, the uplink cancellation information, or both, where at least the second subset of the set of resources is unoccupied by the uplink signaling. The operations of 2125 may be performed in accordance with examples as disclosed herein. In some examples, aspects of the operations of 2125 may be performed by a signaling component 1640 as described herein with reference to FIG. 16.

Figure 22:
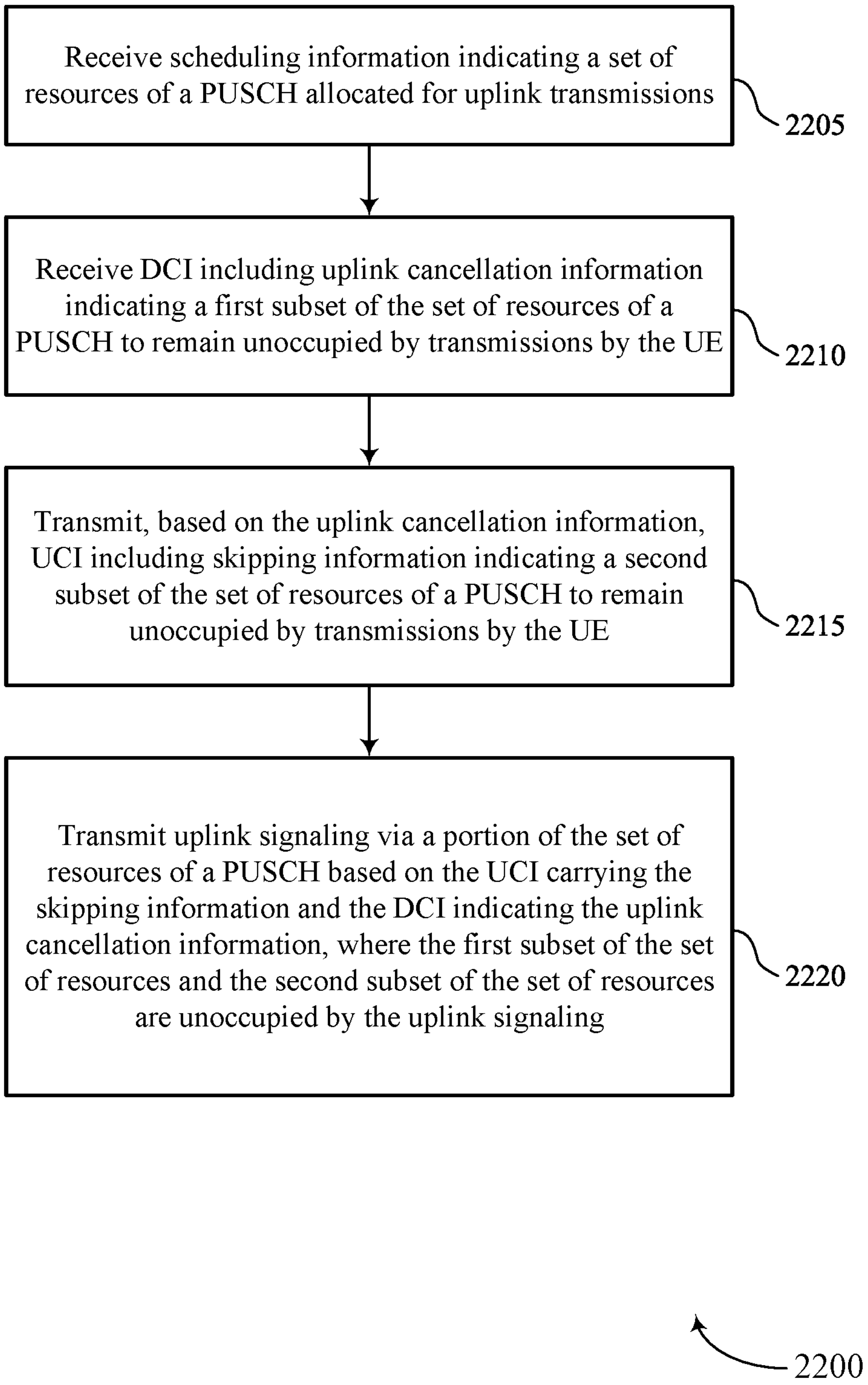

FIG. 22 illustrates a flowchart showing a method 2200 that supports wireless signaling based on downlink cancellation information and uplink skipping information in accordance with one or more aspects of the present disclosure. The operations of the method 2200 may be implemented by a UE or its components as described herein. For example, the operations of the method 2200 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2205, the method may include receiving scheduling information indicating a set of resources of a PUSCH allocated for uplink transmissions. The operations of 2205 may be performed in accordance with examples as disclosed herein. In some examples, aspects of the operations of 2205 may be performed by a scheduling information component 1225 as described herein with reference to FIG. 12.

At 2210, the method may include receiving DCI including uplink cancellation information indicating a first subset of the set of resources of a PUSCH to remain unoccupied by transmissions by the UE. The operations of 2210 may be performed in accordance with examples as disclosed herein. In some examples, aspects of the operations of 2210 may be performed by a DCI component 1235 as described herein with reference to FIG. 12.

At 2215, the method may include transmitting, based on the uplink cancellation information, UCI including skipping information indicating a second subset of the set of resources of a PUSCH to remain unoccupied by transmissions by the UE. The operations of 2215 may be performed in accordance with examples as disclosed herein. In some examples, aspects of the operations of 2215 may be performed by a UCI component 1230 as described herein with reference to FIG. 12.

At 2220, the method may include transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling. The operations of 2220 may be performed in accordance with examples as disclosed herein. In some examples, aspects of the operations of 2220 may be performed by a signaling component 1240 as described herein with reference to FIG. 12.

Figure 23:
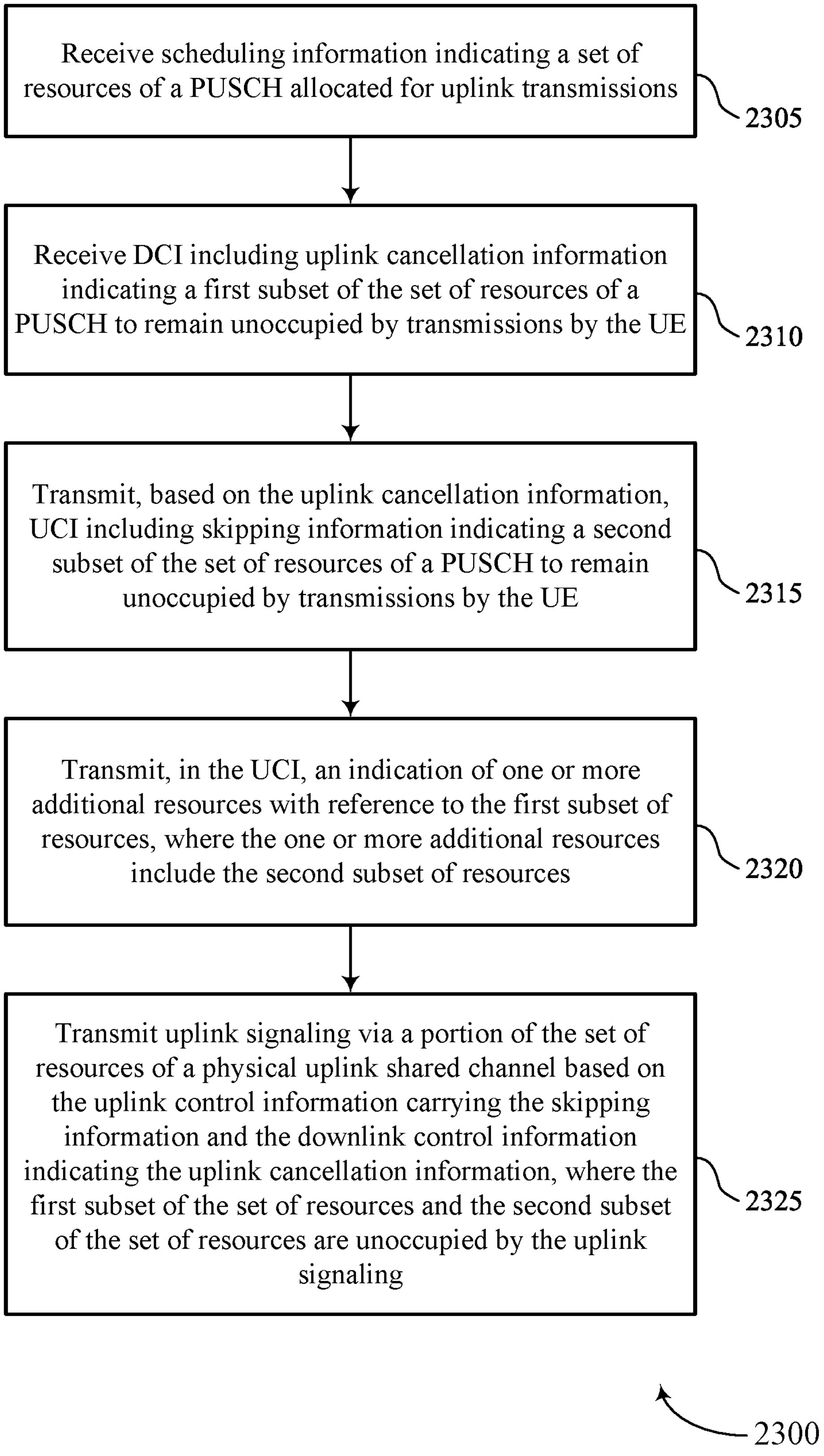

FIG. 23 illustrates a flowchart showing a method 2300 that supports wireless signaling based on downlink cancellation information and uplink skipping information in accordance with one or more aspects of the present disclosure. The operations of the method 2300 may be implemented by a UE or its components as described herein. For example, the operations of the method 2300 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2305, the method may include receiving scheduling information indicating a set of resources of a PUSCH allocated for uplink transmissions. The operations of 2305 may be performed in accordance with examples as disclosed herein. In some examples, aspects of the operations of 2305 may be performed by a scheduling information component 1225 as described herein with reference to FIG. 12.

At 2310, the method may include receiving DCI including uplink cancellation information indicating a first subset of the set of resources of a PUSCH to remain unoccupied by transmissions by the UE. The operations of 2310 may be performed in accordance with examples as disclosed herein. In some examples, aspects of the operations of 2310 may be performed by a DCI component 1235 as described herein with reference to FIG. 12.

At 2315, the method may include transmitting, based on the uplink cancellation information, UCI including skipping information indicating a second subset of the set of resources of a PUSCH to remain unoccupied by transmissions by the UE. The operations of 2315 may be performed in accordance with examples as disclosed herein. In some examples, aspects of the operations of 2315 may be performed by a UCI component 1230 as described herein with reference to FIG. 12.

At 2320, the method may include transmitting, in the UCI, an indication of one or more additional resources with reference to the first subset of resources, where the one or more additional resources include the second subset of resources. The operations of 2320 may be performed in accordance with examples as disclosed herein. In some examples, aspects of the operations of 2320 may be performed by a resource indication component 1250 as described herein with reference to FIG. 12.

At 2325, the method may include transmitting uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling. The operations of 2325 may be performed in accordance with examples as disclosed herein. In some examples, aspects of the operations of 2325 may be performed by a signaling component 1240 as described herein with reference to FIG. 12.

Figure 24:
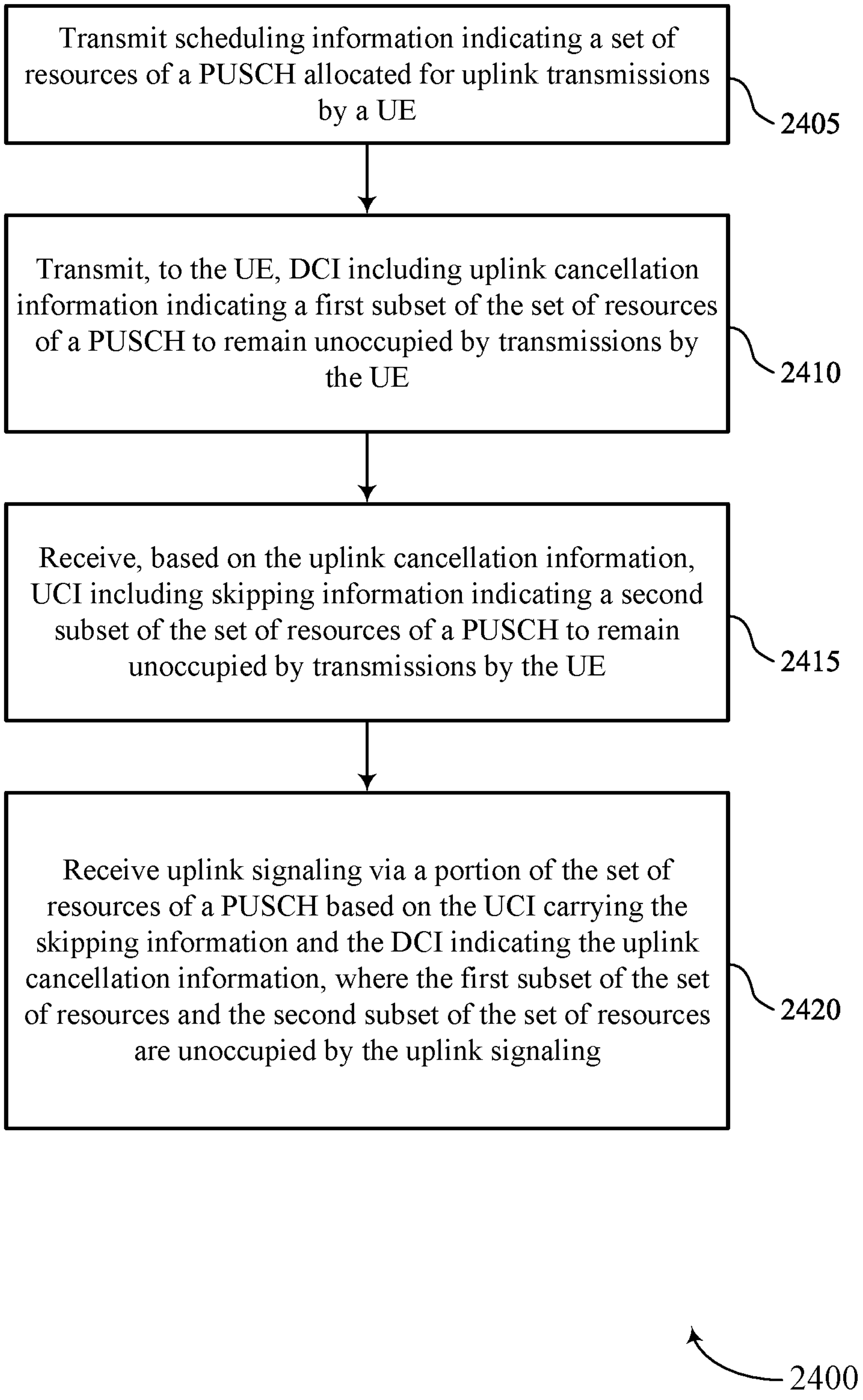

FIG. 24 illustrates a flowchart showing a method 2400 that supports wireless signaling based on downlink cancellation information and uplink skipping information in accordance with one or more aspects of the present disclosure. The operations of the method 2400 may be implemented by a network entity or its components as described herein. For example, the operations of the method 2400 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2405, the method may include transmitting scheduling information indicating a set of resources of a PUSCH allocated for uplink transmissions by a UE. The operations of 2405 may be performed in accordance with examples as disclosed herein. In some examples, aspects of the operations of 2405 may be performed by a scheduling information component 1625 as described herein with reference to FIG. 16.

At 2410, the method may include transmitting, to the UE, DCI including uplink cancellation information indicating a first subset of the set of resources of a PUSCH to remain unoccupied by transmissions by the UE. The operations of 2410 may be performed in accordance with examples as disclosed herein. In some examples, aspects of the operations of 2410 may be performed by a DCI component 1635 as described herein with reference to FIG. 16.

At 2415, the method may include receiving, based on the uplink cancellation information, UCI including skipping information indicating a second subset of the set of resources of a PUSCH to remain unoccupied by transmissions by the UE. The operations of 2415 may be performed in accordance with examples as disclosed herein. In some examples, aspects of the operations of 2415 may be performed by a UCI component 1630 as described herein with reference to FIG. 16.

At 2420, the method may include receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling. The operations of 2420 may be performed in accordance with examples as disclosed herein. In some examples, aspects of the operations of 2420 may be performed by a signaling component 1640 as described herein with reference to FIG. 16.

Figure 25:
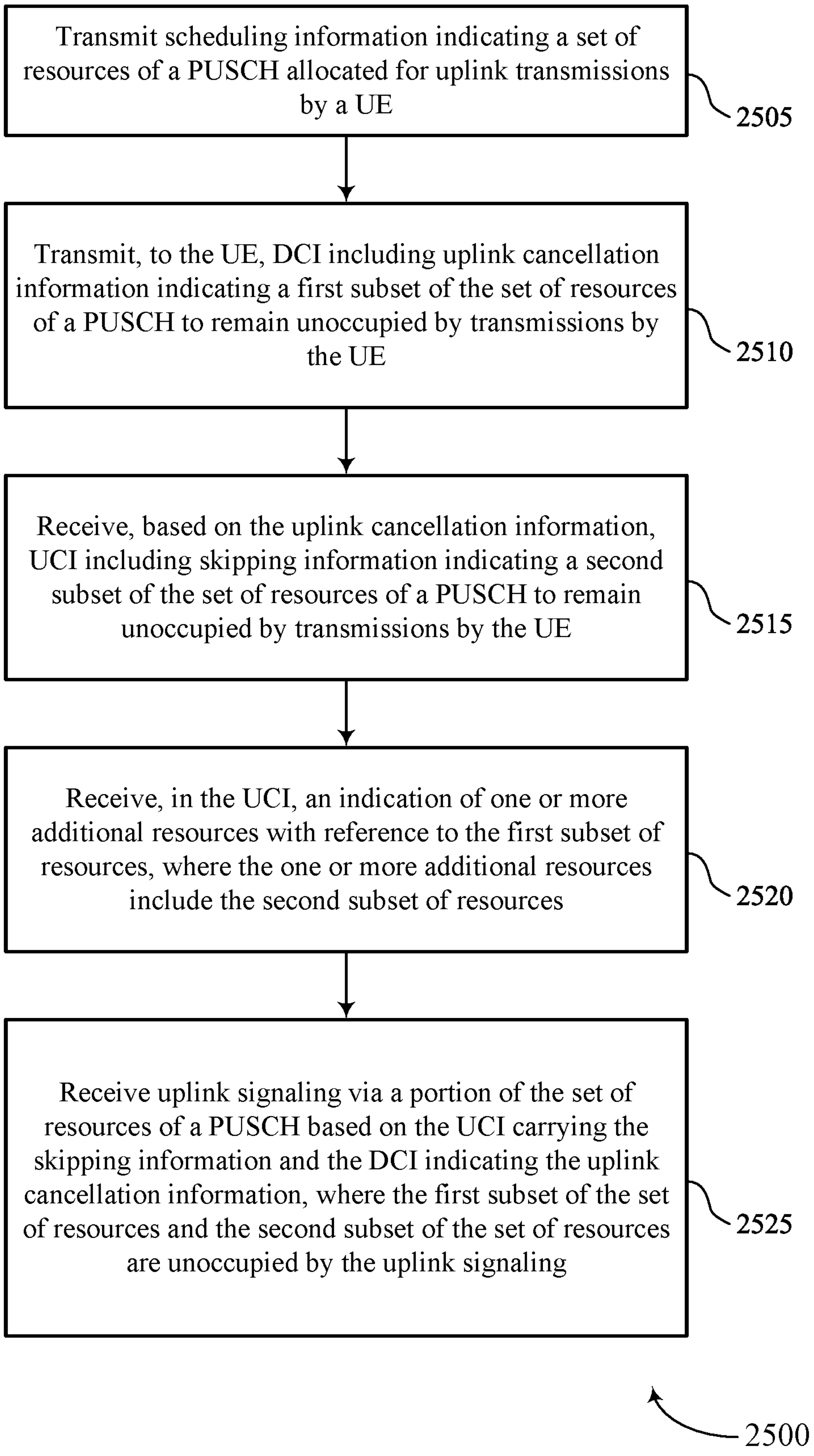

FIG. 25 illustrates a flowchart showing a method 2500 that supports wireless signaling based on downlink cancellation information and uplink skipping information in accordance with one or more aspects of the present disclosure. The operations of the method 2500 may be implemented by a network entity or its components as described herein. For example, the operations of the method 2500 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2505, the method may include transmitting scheduling information indicating a set of resources of a PUSCH allocated for uplink transmissions by a UE. The operations of 2505 may be performed in accordance with examples as disclosed herein. In some examples, aspects of the operations of 2505 may be performed by a scheduling information component 1625 as described herein with reference to FIG. 16.

At 2510, the method may include transmitting, to the UE, DCI including uplink cancellation information indicating a first subset of the set of resources of a PUSCH to remain unoccupied by transmissions by the UE. The operations of 2510 may be performed in accordance with examples as disclosed herein. In some examples, aspects of the operations of 2510 may be performed by a DCI component 1635 as described herein with reference to FIG. 16.

At 2515, the method may include receiving, based on the uplink cancellation information, UCI including skipping information indicating a second subset of the set of resources of a PUSCH to remain unoccupied by transmissions by the UE. The operations of 2515 may be performed in accordance with examples as disclosed herein. In some examples, aspects of the operations of 2515 may be performed by a UCI component 1630 as described herein with reference to FIG. 16.

At 2520, the method may include receiving, in the UCI, an indication of one or more additional resources with reference to the first subset of resources, where the one or more additional resources include the second subset of resources. The operations of 2520 may be performed in accordance with examples as disclosed herein. In some examples, aspects of the operations of 2520 may be performed by a resource indication component 1650 as described herein with reference to FIG. 16.

At 2525, the method may include receiving uplink signaling via a portion of the set of resources of a PUSCH based on the UCI carrying the skipping information and the DCI indicating the uplink cancellation information, where the first subset of the set of resources and the second subset of the set of resources are unoccupied by the uplink signaling. The operations of 2525 may be performed in accordance with examples as disclosed herein. In some examples, aspects of the operations of 2525 may be performed by a signaling component 1640 as described herein with reference to FIG. 16.

The following provides an overview of aspects of the present disclosure:

Aspect 1: A method for wireless communications at a UE, comprising: receiving scheduling information indicating a set of resources of a physical uplink shared channel allocated for uplink transmissions; transmitting UCI comprising skipping information indicating a first subset of the set of resources of a physical uplink shared channel to remain unoccupied by transmissions by the UE; receiving DCI comprising uplink cancellation information indicating a second subset of the set of resources of the physical uplink shared channel to remain unoccupied by transmissions by the UE; and transmitting uplink signaling via a portion of the set of resources of the physical uplink shared channel based at least in part on the UCI carrying the skipping information, the DCI indicating the uplink cancellation information, or both, wherein at least the second subset of the set of resources is unoccupied by the uplink signaling.

Aspect 2: The method of aspect 1, further comprising: receiving control signaling indicating a transmission mode associated with prioritizing the cancellation information over the skipping information, wherein transmitting the uplink signaling is based at least in part on the transmission mode.

Aspect 3: The method of aspect 2, wherein transmitting the uplink signaling comprises: refraining from transmitting via the second subset of the set of resources based at least in part on overriding the skipping information according to the transmission mode; and transmitting the uplink signaling via the first subset of the set of resources and a remainder of the set of resources according to the scheduling information and the uplink cancellation information.

Aspect 4: The method of any of aspects 2 through 3, wherein transmitting the uplink signaling according to the transmission mode associated with prioritizing the uplink cancellation information is based at least in part on transmitting the UCI prior to receiving the DCI; and an amount of time between transmitting the UCI and receiving the DCI does not satisfy a threshold amount of time.

Aspect 5: The method of any of aspects 1 through 4, further comprising: receiving control signaling indicating a transmission mode associated with a combination of the uplink cancellation information and the skipping information, wherein transmitting the uplink signaling is based at least in part on the transmission mode.

Aspect 6: The method of aspect 5, further comprising: receiving, in the DCI, an indication of one or more additional resources with reference to the first subset of resources, wherein the one or more additional resources comprise the second subset of resources.

Aspect 7: The method of any of aspects 5 through 6, wherein transmitting the uplink signaling comprises: refraining from transmitting via the first subset of the set of resources and the second subset of the set of resources according to the transmission mode; and transmitting the uplink signaling via a remainder of the set of resources.

Aspect 8: The method of any of aspects 5 through 7, wherein transmitting the uplink signaling according to the transmission mode associated with the combination of the uplink cancellation information and the skipping information is based at least in part on transmitting the UCI prior to receiving the DCI, and an amount of time between transmitting the UCI and receiving the DCI satisfies a threshold amount of time.

Aspect 9: The method of any of aspects 1 through 8, wherein receiving the scheduling information comprises: receiving RRC signaling comprising configuration information corresponding to one or more CGs corresponding to the set of resources, a DCI message activating the CG, or a combination thereof.

Aspect 10: The method of any of aspects 1 through 9, wherein receiving the scheduling information comprises: receiving a DCI message comprising the scheduling information.

Aspect 11: A method for wireless communications at a network entity, comprising: transmitting scheduling information indicating a set of resources of a physical uplink shared channel allocated for uplink transmissions by a UE; receiving UCI comprising skipping information indicating a first subset of the set of resources of a physical uplink shared channel to remain unoccupied by transmissions by the UE; transmitting DCI comprising uplink cancellation information indicating a second subset of the set of resources of a physical uplink shared channel to remain unoccupied by transmissions by the UE; and receiving uplink signaling via a portion of the set of resources of a physical uplink shared channel based at least in part on the UCI carrying the DCI indicating the skipping information, the uplink cancellation information, or both, wherein at least the second subset of the set of resources is unoccupied by the uplink signaling.

Aspect 12: The method of aspect 11, further comprising: transmitting, to the UE, control signaling indicating a transmission mode associated with prioritizing the uplink cancellation information over the skipping information, wherein receiving the uplink signaling is based at least in part on the transmission mode.

Aspect 13: The method of aspect 12, wherein receiving the uplink signaling comprises: receiving the uplink signaling via the first subset of the set of resources according to the scheduling information and the uplink cancellation information, wherein the second subset of the set of resources remains unoccupied by transmission from the UE according to the transmission mode associated with prioritizing the uplink cancellation information over the skipping information.

Aspect 14: The method of any of aspects 12 through 13, wherein receiving the uplink signaling according to the transmission mode associated with prioritizing the uplink cancellation information is based at least in part on receiving the UCI prior to transmitting the DCI; and an amount of time between receiving the UCI and transmitting the DCI does not satisfy a threshold amount of time.

Aspect 15: The method of any of aspects 11 through 14, further comprising: transmitting control signaling indicating a transmission mode associated with a combination of the uplink cancellation information and the skipping information, wherein transmitting the uplink signaling is based at least in part on the transmission mode.

Aspect 16: The method of aspect 15, further comprising: transmitting, in the DCI, an indication of one or more additional resources with reference to the first subset of resources, wherein the one or more additional resources comprise the second subset of resources.

Aspect 17: The method of any of aspects 15 through 16, wherein receiving the uplink signaling comprises: refraining from monitoring the first subset of the set of resources and the second subset of the second resources according to the transmission mode; and receiving the uplink signaling via a remainder of the set of resources.

Aspect 18: The method of any of aspects 15 through 17, wherein receiving the uplink signaling according to the transmission mode associated with the combination of the uplink cancellation information and the skipping information is based at least in part on receiving the UCI prior to transmitting the DCI, and an amount of time between receiving the UCI and transmitting the DCI satisfies a threshold amount of time.

Aspect 19: The method of any of aspects 11 through 18, wherein transmitting the scheduling information comprises: transmitting RRC signaling comprising configuration information corresponding to one or more CGs corresponding to the set of resources, a DCI message activating the CG, or a combination thereof.

Aspect 20: The method of any of aspects 11 through 19, wherein transmitting the scheduling information comprises: transmitting a DCI message comprising the scheduling information.

Aspect 21: A method for wireless communications at a UE, comprising: receiving scheduling information indicating a set of resources of a physical uplink shared channel allocated for uplink transmissions; receiving DCI comprising uplink cancellation information indicating a first subset of the set of resources of a physical uplink shared channel to remain unoccupied by transmissions by the UE; transmitting, based at least in part on the uplink cancellation information, UCI comprising skipping information indicating a second subset of the set of resources of a physical uplink shared channel to remain unoccupied by transmissions by the UE; transmitting uplink signaling via a portion of the set of resources of a physical uplink shared channel based at least in part on the UCI carrying the skipping information and the DCI indicating the uplink cancellation information, wherein the first subset of the set of resources and the second subset of the set of resources are unoccupied by the uplink signaling.

Aspect 22: The method of aspect 21, further comprising: transmitting, in the UCI, an indication of one or more additional resources with reference to the first subset of resources, wherein the one or more additional resources comprise the second subset of resources.

Aspect 23: The method of aspect 22, further comprising: determining that the one or more additional resources are to remain unoccupied based at least in part on an amount of data corresponding to the uplink signaling, wherein transmitting the UCI is based at least in part on the determining.

Aspect 24: The method of any of aspects 21 through 23, wherein receiving the scheduling information comprises: receiving a CG via RRC signaling comprising an indication of the set of resources, a DCI message activating the CG, or a combination thereof.

Aspect 25: The method of any of aspects 21 through 24, wherein receiving the scheduling information comprises: receiving a DCI message comprising the scheduling information.

Aspect 26: A method for wireless communications at a network entity, comprising: transmitting scheduling information indicating a set of resources of a physical uplink shared channel allocated for uplink transmissions by a UE; transmitting, to the UE, DCI comprising uplink cancellation information indicating a first subset of the set of resources of a physical uplink shared channel to remain unoccupied by transmissions by the UE; receiving, based at least in part on the uplink cancellation information, UCI comprising skipping information indicating a second subset of the set of resources of a physical uplink shared channel to remain unoccupied by transmissions by the UE; and receiving uplink signaling via a portion of the set of resources of a physical uplink shared channel based at least in part on the UCI carrying the skipping information and the DCI indicating the uplink cancellation information, wherein the first subset of the set of resources and the second subset of the set of resources are unoccupied by the uplink signaling.

Aspect 27: The method of aspect 26, further comprising: receiving, in the UCI, an indication of one or more additional resources with reference to the first subset of resources, wherein the one or more additional resources comprise the second subset of resources.

Aspect 28: The method of any of aspects 26 through 27, further comprising: communicating, via at least the first subset of the set of resources, high priority wireless signaling.

Aspect 29: The method of any of aspects 26 through 28, wherein transmitting the scheduling information comprises: transmitting a CG via RRC signaling comprising an indication of the set of resources, a DCI message activating the CG, or a combination thereof.

Aspect 30: The method of any of aspects 26 through 29, wherein transmitting the scheduling information comprises: transmitting a DCI message comprising the scheduling information.

Aspect 31: An apparatus for wireless communications at a UE, comprising a processor; memory coupled with the processor; and instructions stored in the memory and executable by the processor to cause the apparatus to perform a method of any of aspects 1 through 10.

Aspect 32: An apparatus for wireless communications at a UE, comprising at least one means for performing a method of any of aspects 1 through 10.

Aspect 33: A non-transitory computer-readable medium storing code for wireless communications at a UE, the code comprising instructions executable by a processor to perform a method of any of aspects 1 through 10.

Aspect 34: An apparatus for wireless communications at a network entity, comprising a processor; memory coupled with the processor; and instructions stored in the memory and executable by the processor to cause the apparatus to perform a method of any of aspects 11 through 20.

Aspect 35: An apparatus for wireless communications at a network entity, comprising at least one means for performing a method of any of aspects 11 through 20.

Aspect 36: A non-transitory computer-readable medium storing code for wireless communications at a network entity, the code comprising instructions executable by a processor to perform a method of any of aspects 11 through 20.

Aspect 37: An apparatus for wireless communications at a UE, comprising a processor; memory coupled with the processor; and instructions stored in the memory and executable by the processor to cause the apparatus to perform a method of any of aspects 21 through 25.

Aspect 38: An apparatus for wireless communications at a UE, comprising at least one means for performing a method of any of aspects 21 through 25.

Aspect 39: A non-transitory computer-readable medium storing code for wireless communications at a UE, the code comprising instructions executable by a processor to perform a method of any of aspects 21 through 25.

Aspect 40: An apparatus for wireless communications at a network entity, comprising a processor; memory coupled with the processor; and instructions stored in the memory and executable by the processor to cause the apparatus to perform a method of any of aspects 26 through 30.

Aspect 41: An apparatus for wireless communications at a network entity, comprising at least one means for performing a method of any of aspects 26 through 30.

Aspect 42: A non-transitory computer-readable medium storing code for wireless communications at a network entity, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
- a processor; and
- memory coupled with the processor, with instructions stored in the memory, the instructions executable by the processor to cause the apparatus to:
  - receive scheduling information indicating a set of resources of a physical uplink shared channel allocated for uplink transmissions;
  - transmit uplink control information comprising skipping information indicating a first subset of the set of resources of the physical uplink shared channel to remain unoccupied by transmissions by the UE;
  - receive downlink control information comprising uplink cancellation information indicating a second subset of the set of resources of the physical uplink shared channel to remain unoccupied by transmissions by the UE; and
  - transmit uplink signaling via a portion of the set of resources of the physical uplink shared channel based at least in part on both the uplink control information carrying the skipping information and the downlink control information indicating the uplink cancellation information, wherein at least the second subset of the set of resources is unoccupied by the uplink signaling.

2. The apparatus of claim 1, wherein the instructions are further executable by the processor to cause the apparatus to:
- receive control signaling indicating a transmission mode associated with prioritizing the uplink cancellation information over the skipping information, wherein transmitting the uplink signaling is based at least in part on the transmission mode.

3. The apparatus of claim 2, wherein the instructions to transmit the uplink signaling are executable by the processor to cause the apparatus to:
- refrain from transmitting via the second subset of the set of resources based at least in part on overriding the skipping information according to the transmission mode; and
- transmit the uplink signaling via the first subset of the set of resources and a remainder of the set of resources according to the scheduling information and the uplink cancellation information.

4. The apparatus of claim 2, wherein transmitting the uplink signaling according to the transmission mode associated with prioritizing the uplink cancellation information is based at least in part on transmitting the uplink control information prior to receiving the downlink control information, and an amount of time between transmitting the uplink control information and receiving the downlink control information does not satisfy a threshold amount of time.

5. The apparatus of claim 1, wherein the instructions are further executable by the processor to cause the apparatus to:
- receive control signaling indicating a transmission mode associated with a combination of the uplink cancellation information and the skipping information, wherein transmitting the uplink signaling is based at least in part on the transmission mode.

6. The apparatus of claim 5, wherein the instructions are further executable by the processor to cause the apparatus to:
- receive, in the downlink control information, an indication of one or more additional resources with reference to the first subset of the set of resources, wherein the one or more additional resources comprise the second subset of the set of resources.

7. The apparatus of claim 5, wherein the instructions to transmit the uplink signaling are executable by the processor to cause the apparatus to:
- refrain from transmitting via the first subset of the set of resources and the second subset of the set of resources according to the transmission mode; and
- transmit the uplink signaling via a remainder of the set of resources.

8. The apparatus of claim 5, wherein transmitting the uplink signaling according to the transmission mode associated with the combination of the uplink cancellation information and the skipping information is based at least in part on transmitting the uplink control information prior to receiving the downlink control information, and an amount of time between transmitting the uplink control information and receiving the downlink control information satisfies a threshold amount of time.

9. The apparatus of claim 1, wherein the instructions to receive the scheduling information are executable by the processor to cause the apparatus to:

receive radio resource control signaling comprising configuration information corresponding to one or more configured grants corresponding to the set of resources, a downlink control information message activating a configured grant, or a combination thereof.

10. The apparatus of claim 1, wherein the instructions to receive the scheduling information are executable by the processor to cause the apparatus to:

receive a downlink control information message comprising the scheduling information.

11. An apparatus for wireless communications at a network entity, comprising:

a processor; and memory coupled with the processor, with instructions stored in the memory, the instructions executable by the processor to cause the apparatus to:

transmit scheduling information indicating a set of resources of a physical uplink shared channel allocated for uplink transmissions by a user equipment (UE);

receive uplink control information comprising skipping information indicating a first subset of the set of resources of the physical uplink shared channel to remain unoccupied by transmissions by the UE;

transmit downlink control information comprising uplink cancellation information indicating a second subset of the set of resources of the physical uplink shared channel to remain unoccupied by transmissions by the UE; and receive uplink signaling via a portion of the set of resources of the physical uplink shared channel based at least in part on both the uplink control information carrying the skipping information and the downlink control information indicating the uplink cancellation information, wherein at least the second subset of the set of resources is unoccupied by the uplink signaling.

12. The apparatus of claim 11, wherein the instructions are further executable by the processor to cause the apparatus to:

transmit, to the UE, control signaling indicating a transmission mode associated with prioritizing the uplink cancellation information over the skipping information, wherein receiving the uplink signaling is based at least in part on the transmission mode.

13. The apparatus of claim 12, wherein the instructions to receive the uplink signaling are executable by the processor to cause the apparatus to:

receive the uplink signaling via the first subset of the set of resources according to the scheduling information and the uplink cancellation information, wherein the second subset of the set of resources remains unoccupied by transmission from the UE according to the transmission mode associated with prioritizing the uplink cancellation information over the skipping information.

14. The apparatus of claim 12, wherein receiving the uplink signaling according to the transmission mode associated with prioritizing the uplink cancellation information is based at least in part on receiving the uplink control information prior to transmitting the downlink control information, and an amount of time between receiving the uplink control information and transmitting the downlink control information does not satisfy a threshold amount of time.

15. The apparatus of claim 11, wherein the instructions are further executable by the processor to cause the apparatus to:

transmit control signaling indicating a transmission mode associated with a combination of the uplink cancellation information and the skipping information, wherein transmitting the uplink signaling is based at least in part on the transmission mode.

16. The apparatus of claim 15, wherein the instructions are further executable by the processor to cause the apparatus to:

transmit, in the downlink control information, an indication of one or more additional resources with reference to the first subset of the set of resources, wherein the one or more additional resources comprise the second subset of the set of resources.

17. The apparatus of claim 15, wherein the instructions to receive the uplink signaling are executable by the processor to cause the apparatus to:

refrain from monitoring the first subset of the set of resources and the second subset of the set of resources according to the transmission mode; and receive the uplink signaling via a remainder of the set of resources.

18. The apparatus of claim 15, wherein receiving the uplink signaling according to the transmission mode associated with the combination of the uplink cancellation information and the skipping information is based at least in part on receiving the uplink control information prior to transmitting the downlink control information, and an amount of time between receiving the uplink control information and transmitting the downlink control information satisfies a threshold amount of time.

19. The apparatus of claim 11, wherein the instructions to transmit the scheduling information are executable by the processor to cause the apparatus to:

transmit radio resource control signaling comprising configuration information corresponding to one or more configured grants corresponding to the set of resources, a downlink control information message activating a configured grant, or a combination thereof.

20. The apparatus of claim 11, wherein the instructions to transmit the scheduling information are executable by the processor to cause the apparatus to:

transmit a downlink control information message comprising the scheduling information.

21. An apparatus for wireless communications at a user equipment (UE), comprising:

at least one processor; and at least one memory coupled with the at least one processor, with instructions stored in the at least one memory, the instructions being executable by the at least one processor, individually or in any combination, to cause the apparatus to:

receive scheduling information indicating a set of resources of a physical uplink shared channel allocated for uplink transmissions;

receive downlink control information comprising uplink cancellation information indicating a first subset of the set of resources of the physical uplink shared channel to remain unoccupied by transmissions by the UE;

transmit, based at least in part on the uplink cancellation information, uplink control information comprising skipping information indicating a second subset of the set of resources of the physical uplink shared channel to remain unoccupied by transmissions by the UE; and transmit uplink signaling via a portion of the set of resources of the physical uplink shared channel based at least in part on both the uplink control information carrying the skipping information and the downlink control information indicating the uplink cancellation information, wherein the first subset of the set of resources and the second subset of the set of resources are unoccupied by the uplink signaling.

22. The apparatus of claim 21, wherein the instructions are further executable by the at least one processor to cause the apparatus to:

transmit, in the uplink control information, an indication of one or more additional resources with reference to the first subset of the set of resources, wherein the one or more additional resources comprise the second subset of the set of resources.

23. The apparatus of claim 22, wherein the instructions are further executable by the at least one processor to cause the apparatus to:

determine that the one or more additional resources are to remain unoccupied based at least in part on an amount of data corresponding to the uplink signaling, wherein transmitting the uplink control information is based at least in part on the determining.

24. The apparatus of claim 21, wherein the instructions to receive the scheduling information are executable by the at least one processor to cause the apparatus to:

receive a configured grant via radio resource control signaling comprising an indication of the set of resources, a downlink control information message activating the configured grant, or a combination thereof.

25. The apparatus of claim 21, wherein the instructions to receive the scheduling information are executable by the at least one processor to cause the apparatus to:

receive a downlink control information message comprising the scheduling information.

26. An apparatus for wireless communications at a network entity, comprising:

at least one processor; and at least one memory coupled with the at least one processor, with instructions stored in the at least one memory, the instructions being executable by the at least one processor, individually or in any combination, to cause the apparatus to:

transmit scheduling information indicating a set of resources of a physical uplink shared channel allocated for uplink transmissions by a user equipment (UE);

transmit, to the UE, downlink control information comprising uplink cancellation information indicating a first subset of the set of resources of the physical uplink shared channel to remain unoccupied by transmissions by the UE;

receive, based at least in part on the uplink cancellation information, uplink control information comprising skipping information indicating a second subset of the set of resources of the physical uplink shared channel to remain unoccupied by transmissions by the UE; and receive uplink signaling via a portion of the set of resources of the physical uplink shared channel based at least in part on both the uplink control information carrying the skipping information and the downlink control information indicating the uplink cancellation information, wherein the first subset of the set of resources and the second subset of the set of resources are unoccupied by the uplink signaling.

27. The apparatus of claim 26, wherein the instructions are further executable by the at least one processor to cause the apparatus to:

receive, in the uplink control information, an indication of one or more additional resources with reference to the first subset of the set of resources, wherein the one or more additional resources comprise the second subset of the set of resources.

28. The apparatus of claim 26, wherein the instructions are further executable by the at least one processor to cause the apparatus to:

communicate, via at least the first subset of the set of resources, high priority wireless signaling.

29. The apparatus of claim 26, wherein the instructions to transmit the scheduling information are executable by the at least one processor to cause the apparatus to:

transmit a configured grant via radio resource control signaling comprising an indication of the set of resources, a downlink control information message activating the configured grant, or a combination thereof.

30. The apparatus of claim 26, wherein the instructions to transmit the scheduling information are executable by the at least one processor to cause the apparatus to:

transmit a downlink control information message comprising the scheduling information.

* * * * *